M. BARR & R. A. BELL.
CALCULATING MACHINE.
APPLICATION FILED OCT. 24, 1911.
1,272,889.
Patented July 16, 1918.
24 SHEETS—SHEET 7.
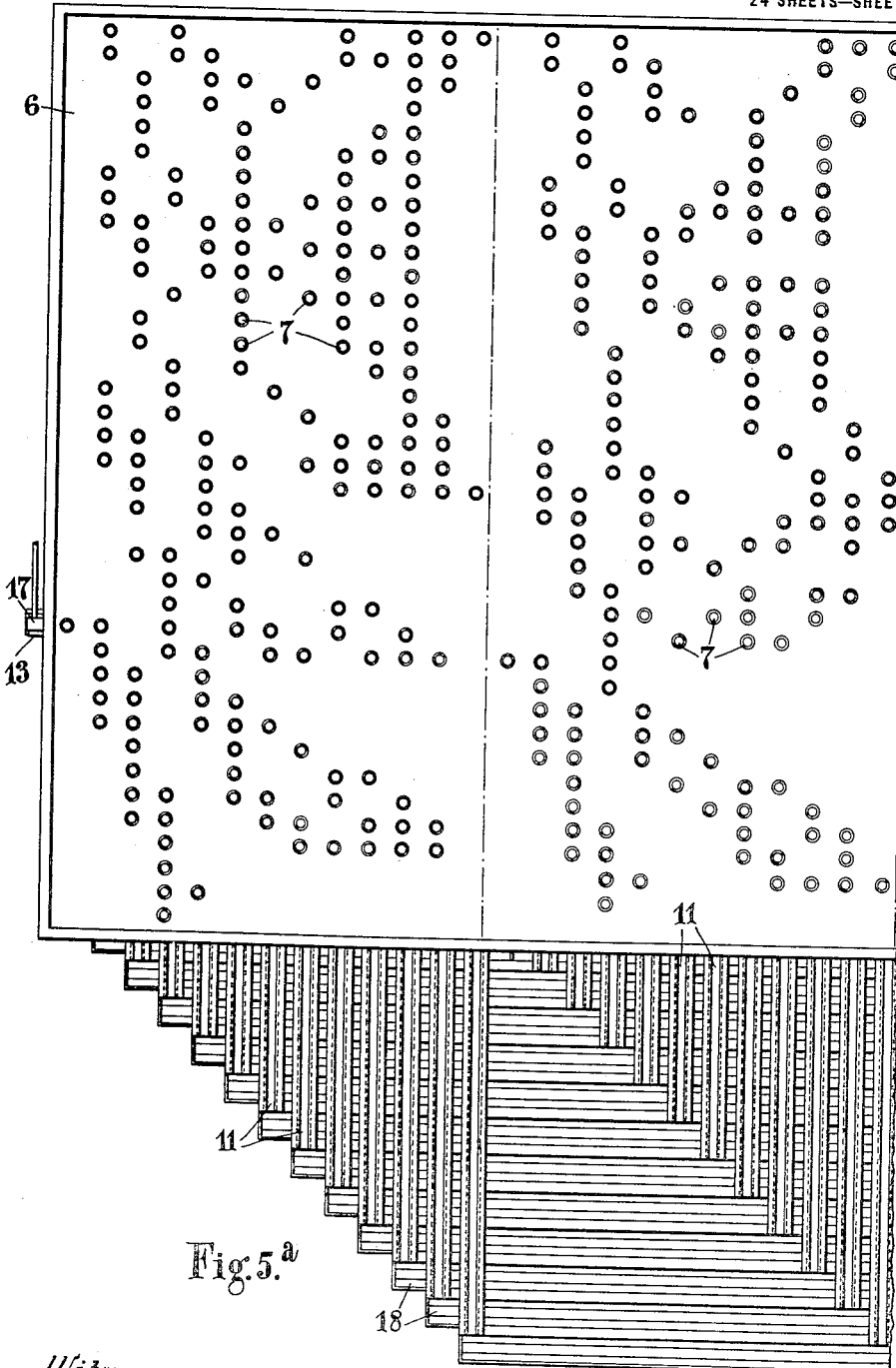
Fig. 5.ª
Witnesses
Sidney Brooks
John P. Davis
Inventors
Mark Barr
Robert Arthur Bell
BY Munn & Co
Attorney

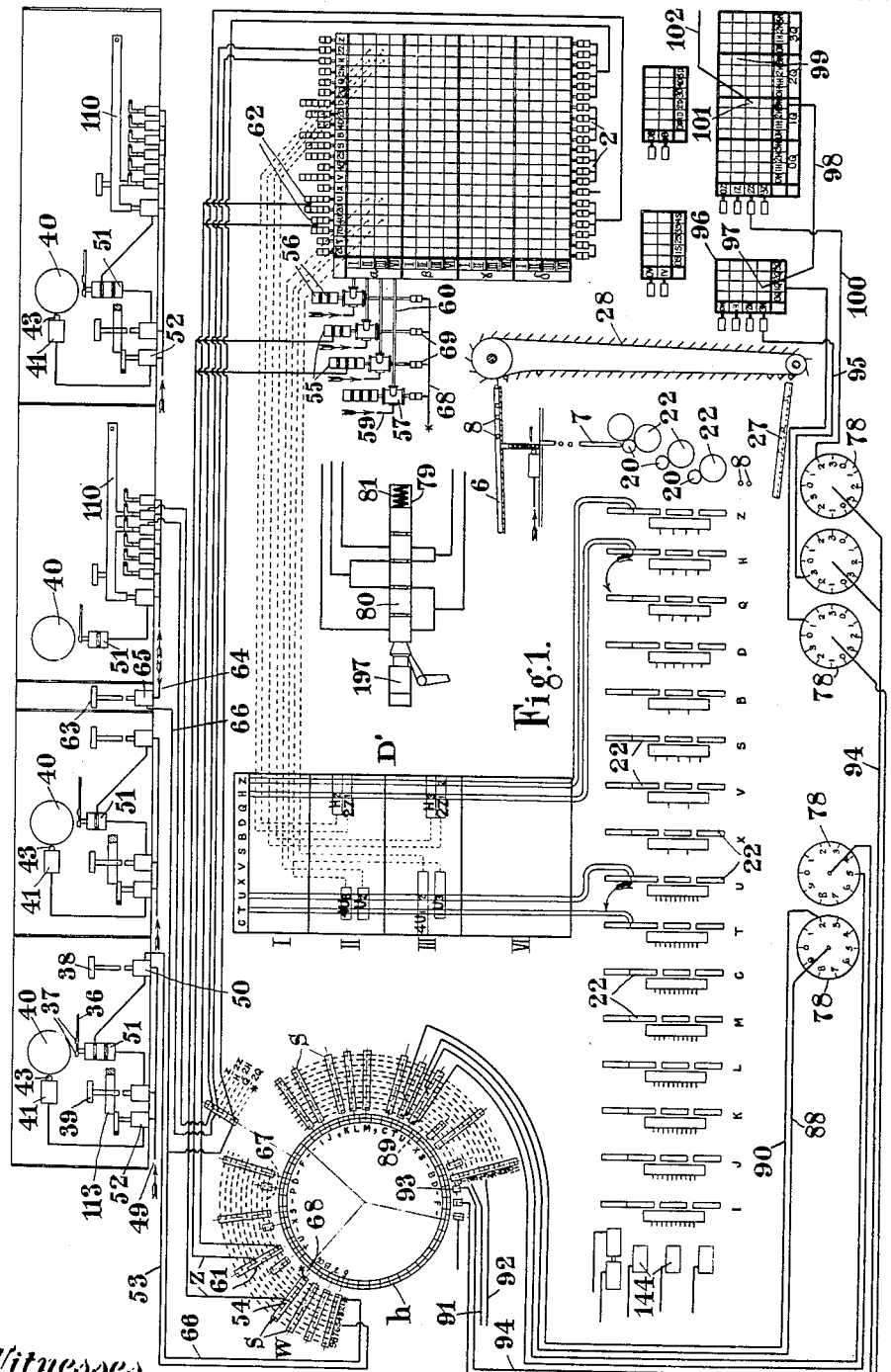

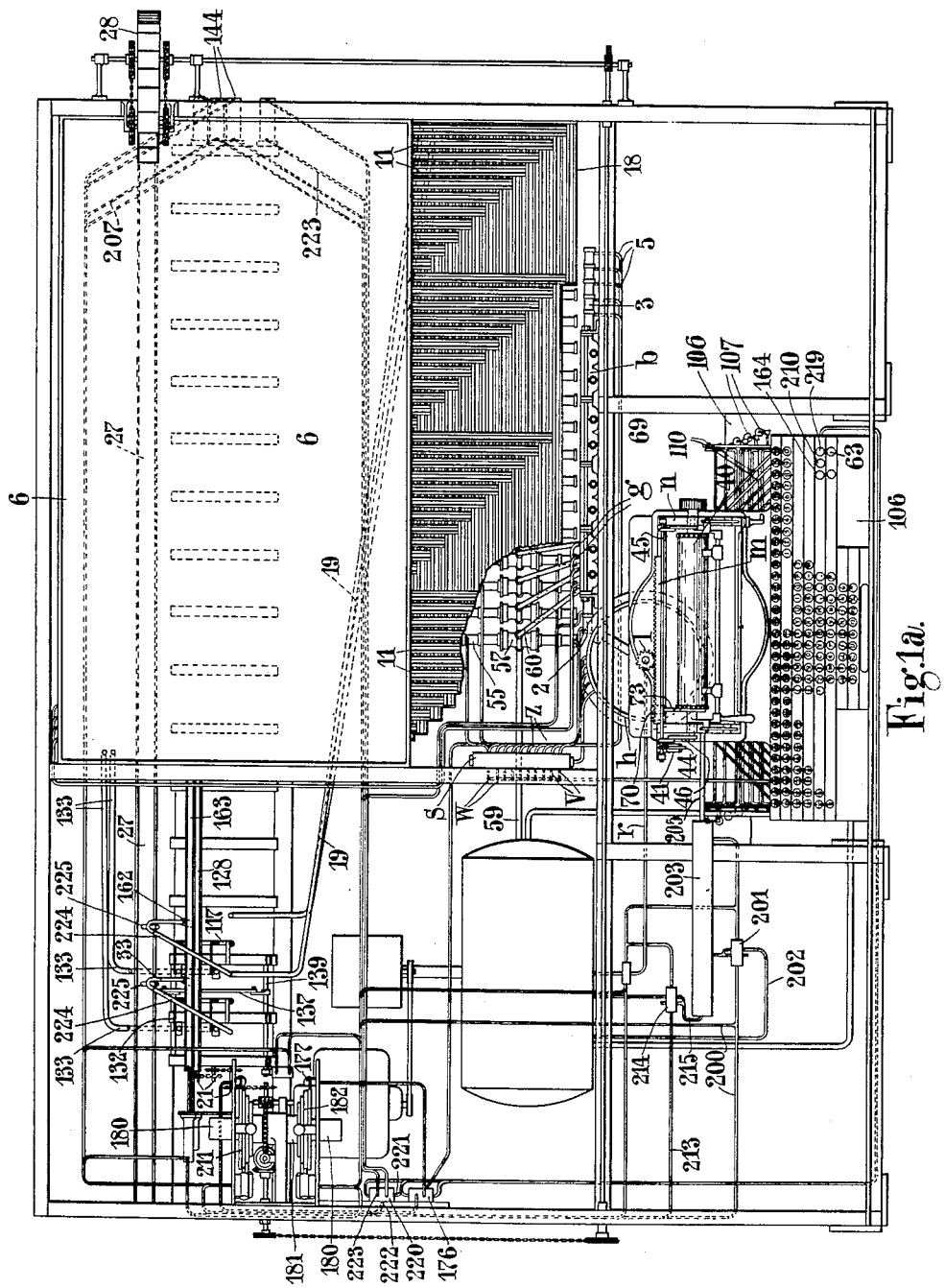

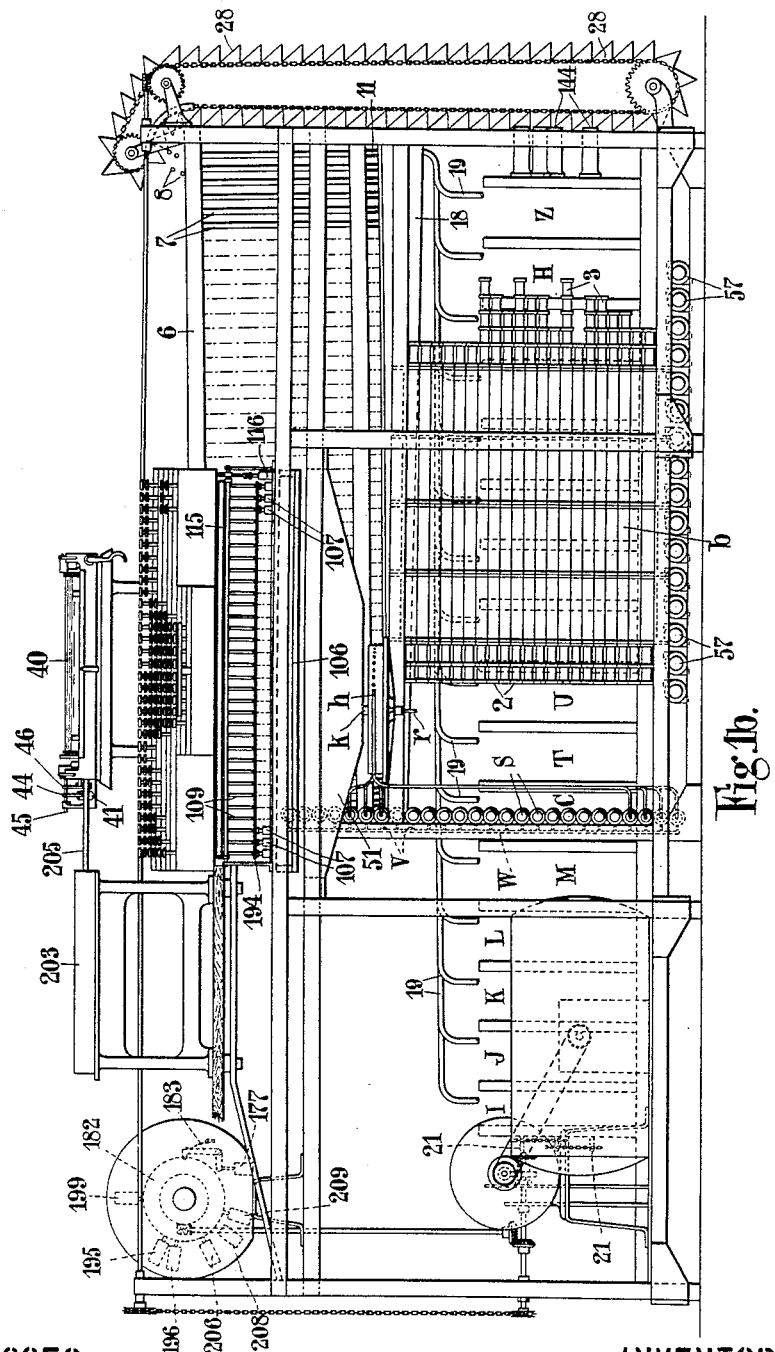

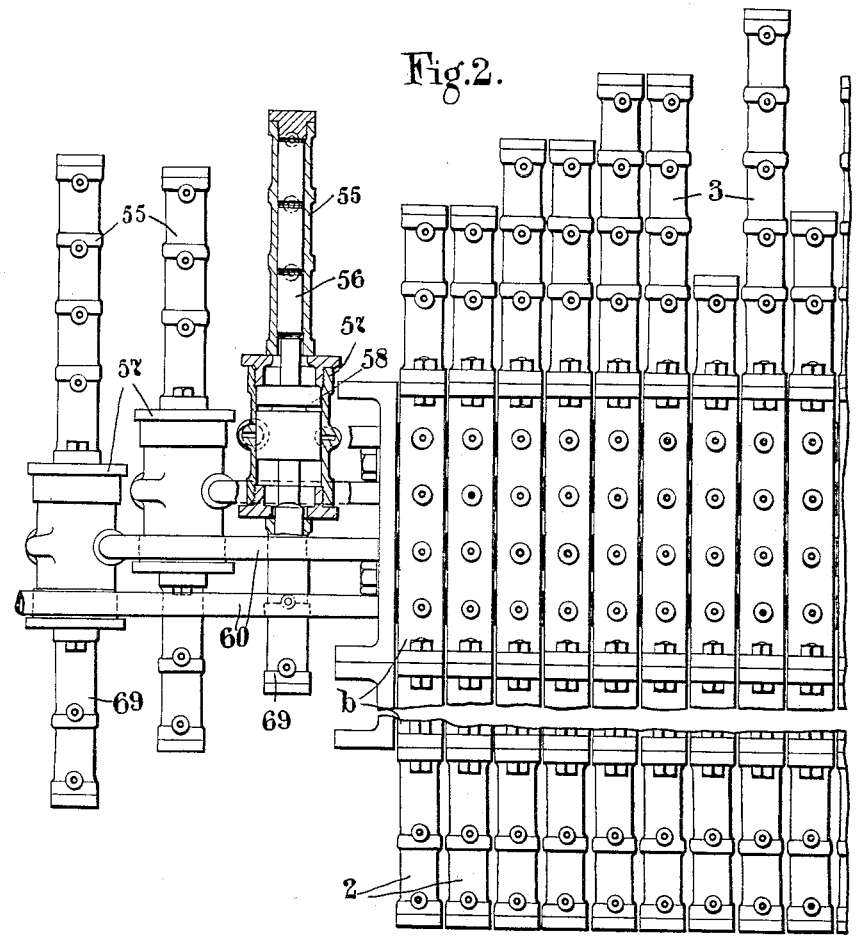

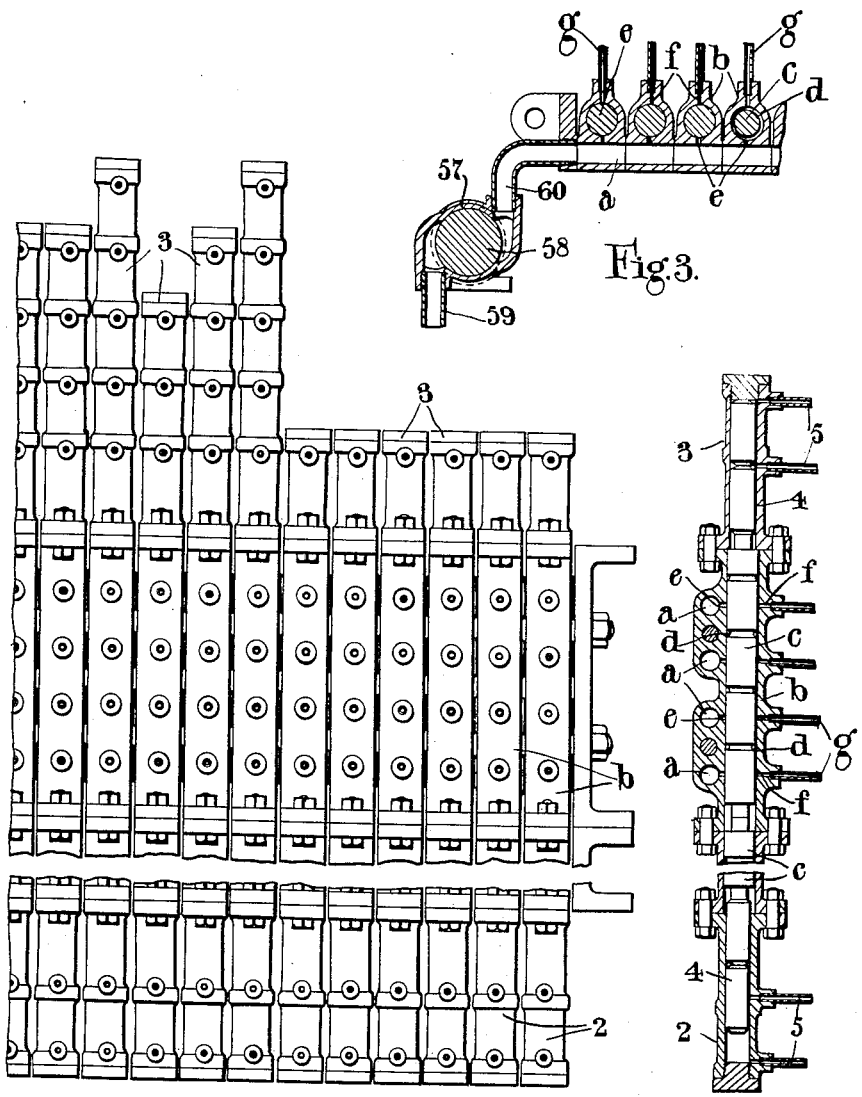

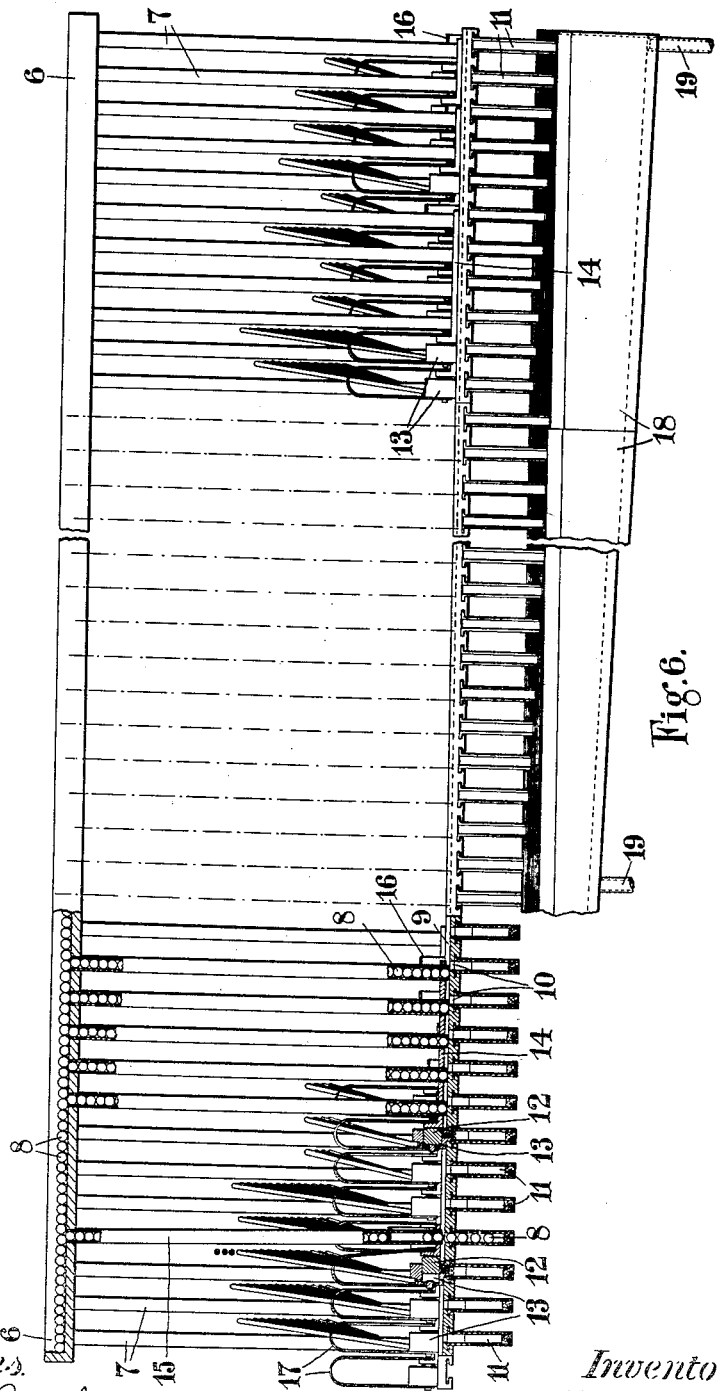

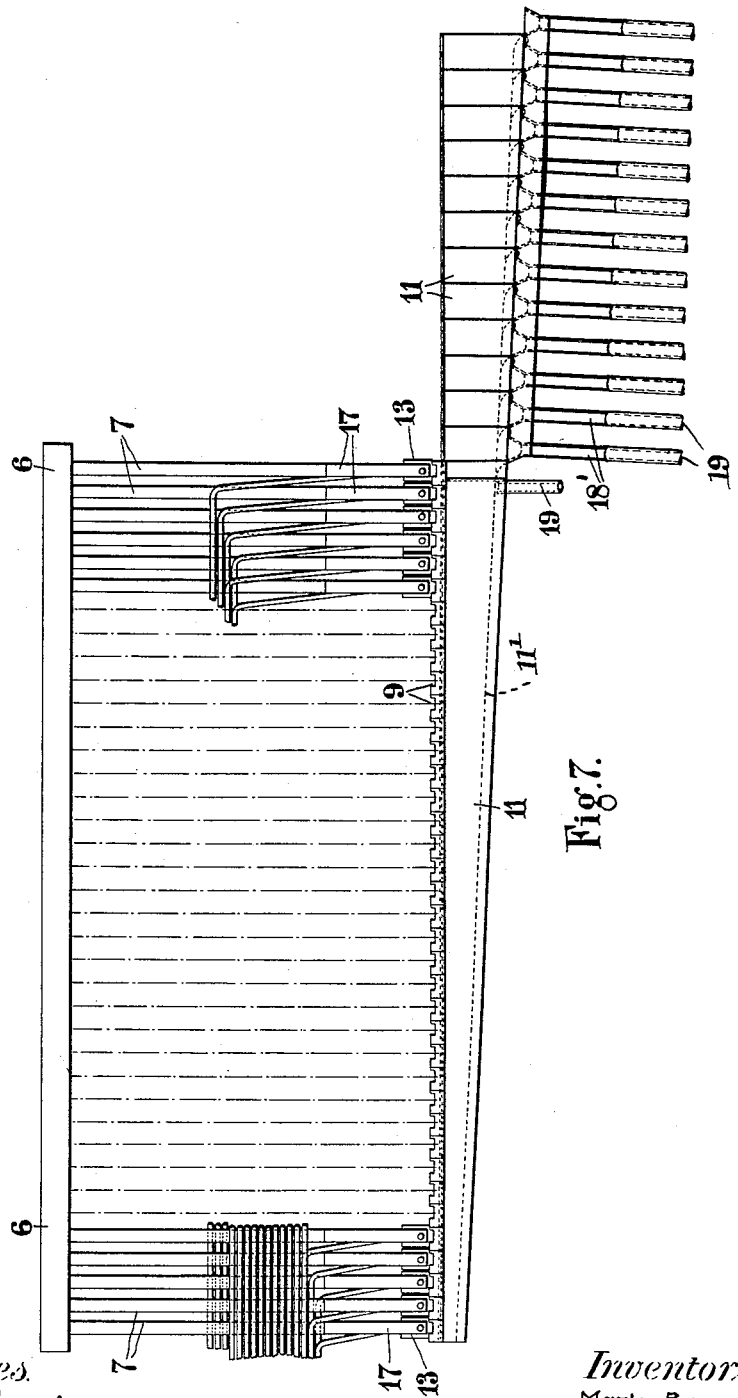

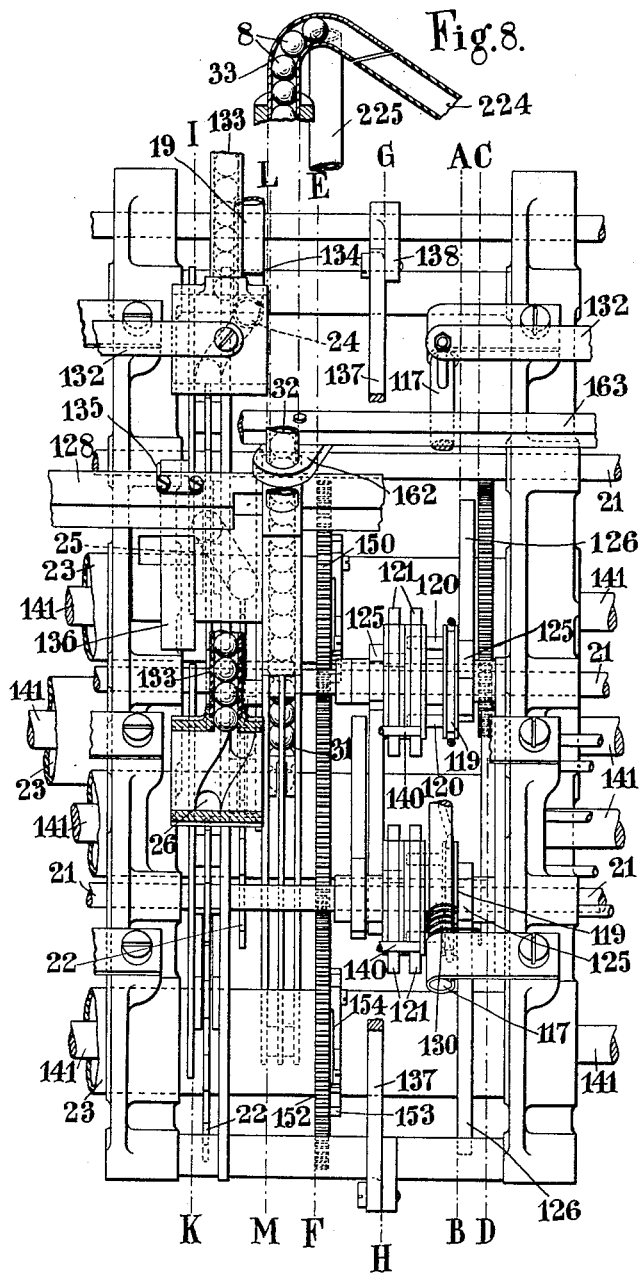

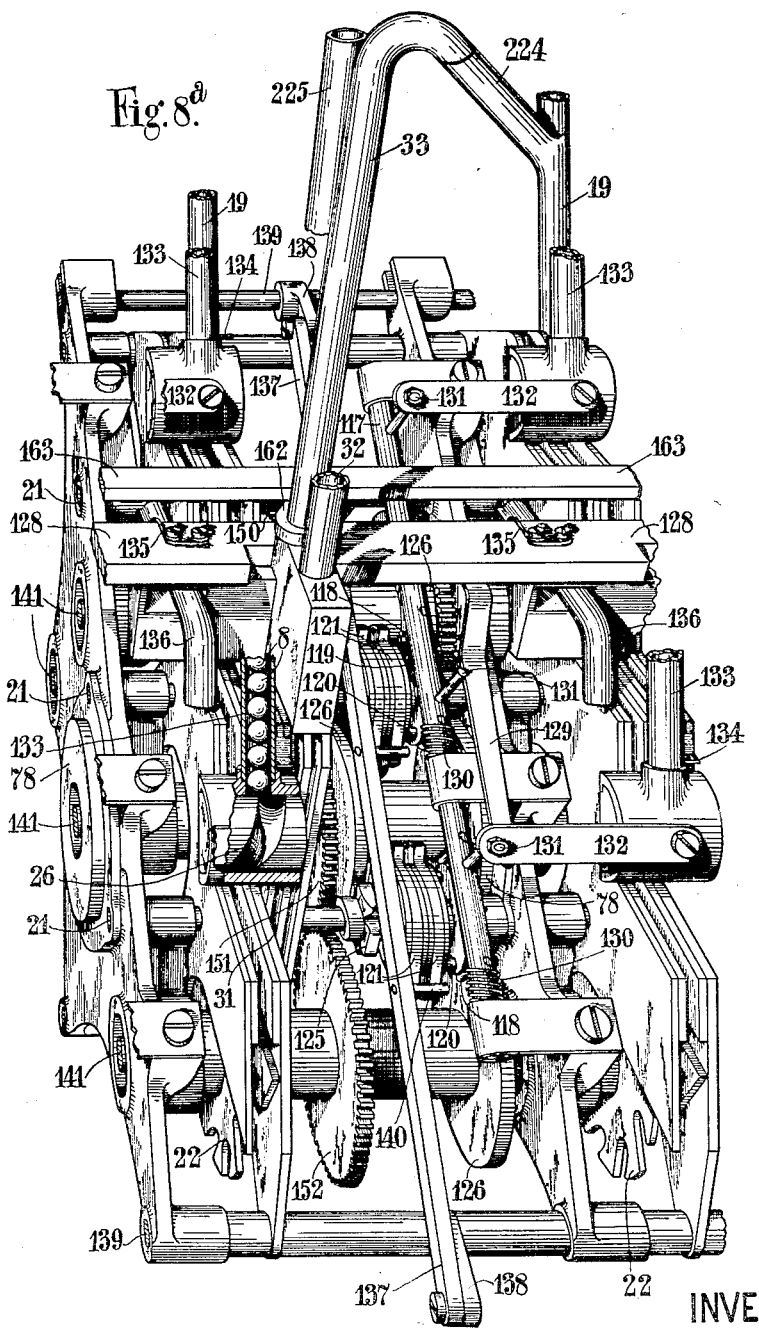

M. BARR & R. A. BELL.
CALCULATING MACHINE.
APPLICATION FILED OCT. 24, 1911.

1,272,889.

Patented July 16, 1918.
24 SHEETS—SHEET 13.

Witnesses.
Sidney Brooks
John P. Davis

Inventors
Mark Barr
Robert Arthur Bell
By Munn & Co
Attorney

M. BARR & R. A. BELL.
CALCULATING MACHINE.
APPLICATION FILED OCT. 24, 1911.

1,272,889.

Patented July 16, 1918.
24 SHEETS—SHEET 14.

Witnesses.
Sidney Brooker
John P. Davis

Inventors.
Mark Barr
Robert Arthur Bell
BY Munn & Co
Attorney

M. BARR & R. A. BELL.
CALCULATING MACHINE.
APPLICATION FILED OCT. 24, 1911.

1,272,889.

Patented July 16, 1918.
24 SHEETS—SHEET 18.

WITNESSES:

INVENTORS
Mark Barr
Robert Arthur Bell
BY
ATTORNEYS

M. BARR & R. A. BELL.
CALCULATING MACHINE.
APPLICATION FILED OCT. 24, 1911.

1,272,889.

Patented July 16, 1918.
24 SHEETS—SHEET 19.

Witnesses.
Sidney Brooks
John P. Davis

Inventors.
Mark Barr
Robert Arthur Bell
BY Munn & Co
Attorney.

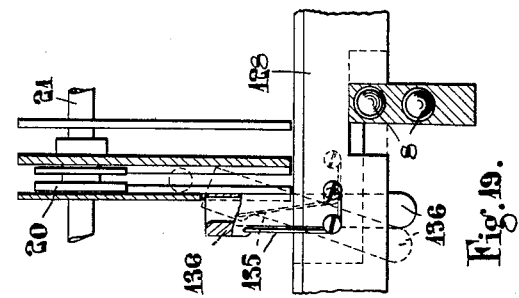
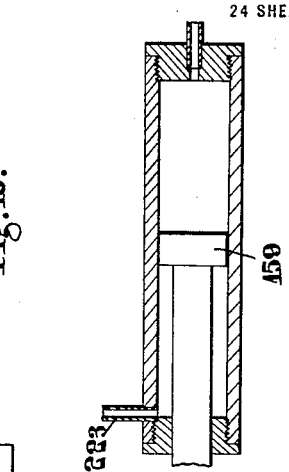
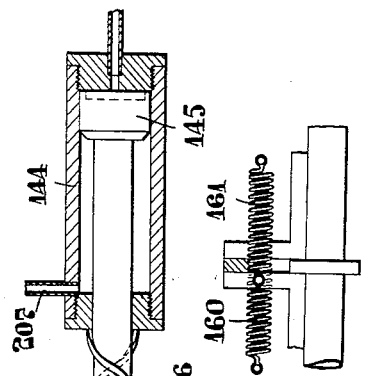
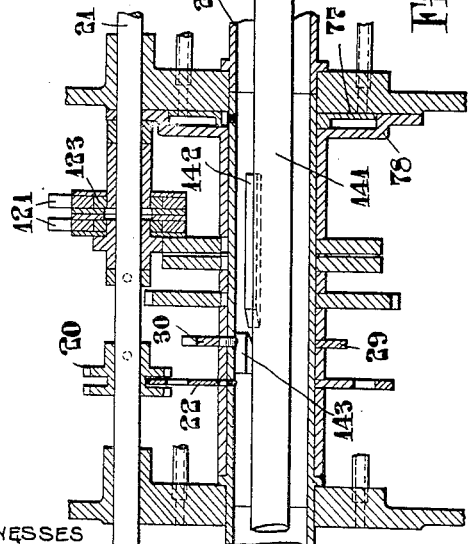
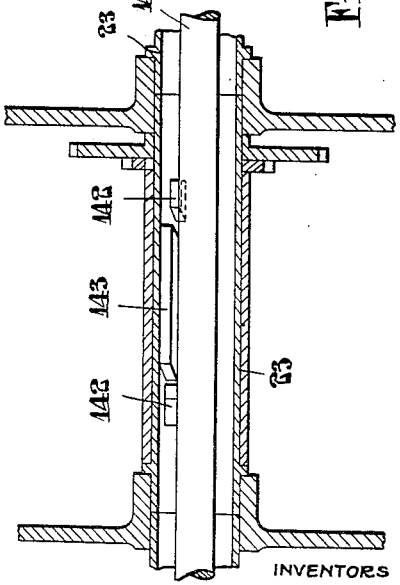

M. BARR & R. A. BELL.
CALCULATING MACHINE.
APPLICATION FILED OCT. 24, 1911.

1,272,889.

Patented July 16, 1913.
24 SHEETS—SHEET 21.

Witnesses.
Sidney Brooks
John F. Davis

Inventors
Mark Barr
Robert Arthur Bell
BY
Munn & Co.
Attorney

M. BARR & R. A. BELL.
CALCULATING MACHINE.
APPLICATION FILED OCT. 24, 1911.

1,272,889.

Patented July 16, 1918.
24 SHEETS—SHEET 22.

Witnesses.
Sidney Brooks
John P. Davis

Inventors.
Mark Barr
Robert Arthur Bell
BY Munn Co
Attorneys

Fig. 25.

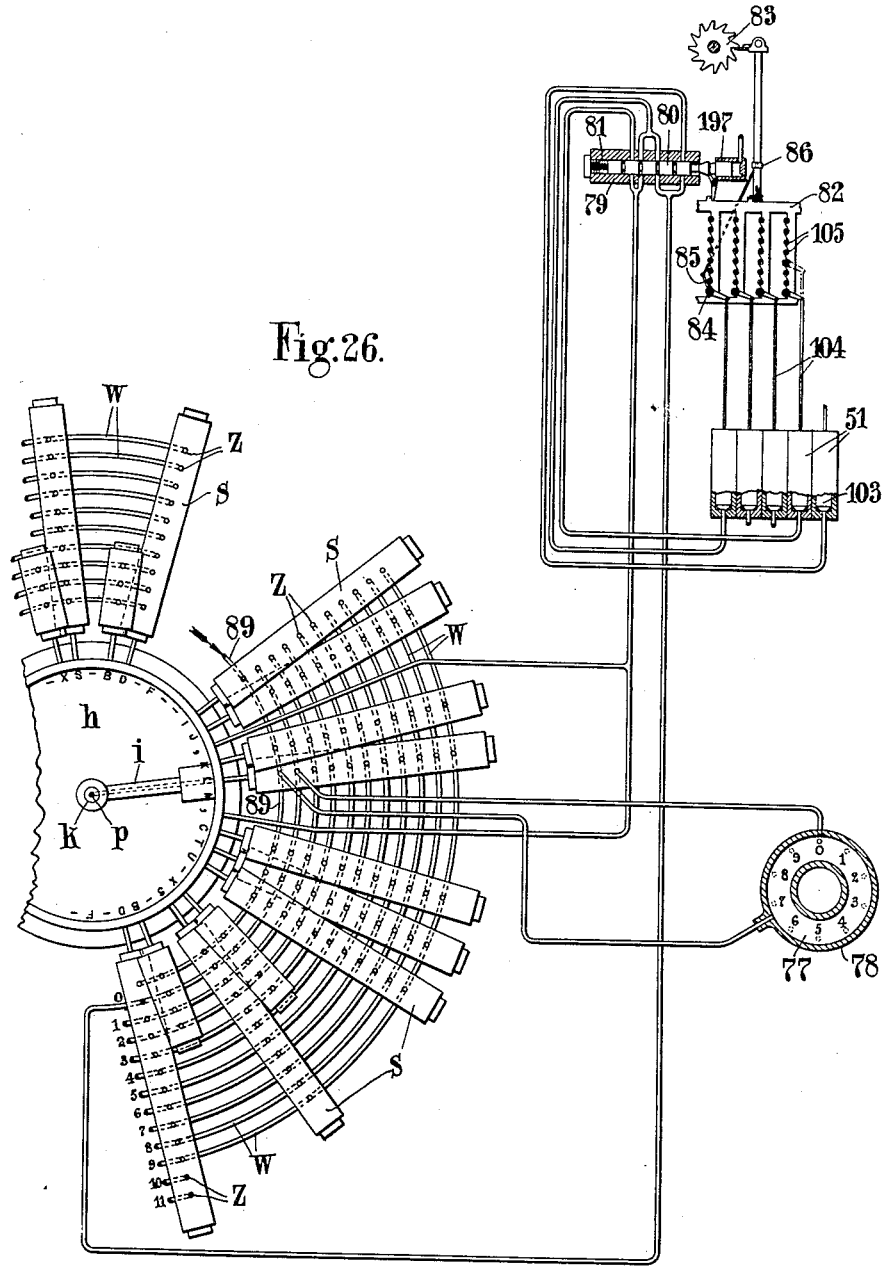

UNITED STATES PATENT OFFICE.

MARK BARR, OF LONDON, AND ROBERT ARTHUR BELL, OF WIMBLEDON, ENGLAND, ASSIGNORS OF ONE-THIRD TO HENRY RAMIE BEETON, OF LONDON, ENGLAND.

CALCULATING-MACHINE.

1,272,889. Specification of Letters Patent. Patented July 16, 1918.

Application filed October 24, 1911. Serial No. 656,366.

*To all whom it may concern:*

Be it known that we, MARK BARR, of 3 Gloucester Mansions, London, S. W., England, and ROBERT ARTHUR BELL, of 116 Worple road, Wimbledon, in the county of Surrey, England, have invented certain new and useful Improvements in and Relating to Calculating-Machines, of which the following is a description.

This invention relates to calculating machines of the type in which all the partial products obtained by the multiplication of two numbers that can occur within the limits of calculation of the machine whether such numbers be rates, percentages, measures, values, fractional numbers or numbers generally, are stored in the machine.

Hitherto certain proposals have been made for the construction of machines of the above type but all such machines have depended for their operation upon the employment of stepped or slotted cams, disks or plates in combination with fingers or feelers so arranged that on depression of a particular key of the machine a particular plate or disk is given an angular movement, the amount of which depends upon the value of the key depressed. Each plate or disk, therefore, represents a number of partial products depending upon the number of angular positions that can be given to the plate and upon the form or contour of the same, and the value of any particular partial product represented by the plate in any angular position is determined by the amount of movement that is allowed to the finger or feeler which amount of movement depends upon the contour of the particular portion of the plate presented to the finger. Such machines are subject to grave disadvantages in that they are exceedingly slow in operation seeing that it is necessary to count first the units, then the tens, then the hundreds and so on, and that any carrying of tens that is required must be held back until the various denominations have been counted in the manner referred to. Moreover, any wear in the coöperating parts leads to inaccuracy in the results given by the machine, the error due to wear being cumulative so that the inaccuracy may be very great even though the wear is comparatively slight.

The object of the present invention is to devise a form of multiplying machine of the type referred to which shall be free from the above disadvantages by being rapid and accurate in operation owing to its being possible to count all denominations simultaneously and to effect any "carry" that may be required during the counting operation while at the same time wear of the operating parts shall have no effect upon the accuracy of the results obtained by the machine.

The invention consists in a calculating or computing machine of the type wherein the partial products occurring within the limits of the machine are stored therein, characterized therein that each partial product is represented by a separate individual unit which may comprise a single object or a group of separate and distinct objects, depending upon the value of the particular partial product which it represents.

The invention also consists in other details and arrangements hereinafter more particularly referred to.

In the accompanying drawings which illustrate one mode of carrying out the invention—

Figure 1 is a general diagrammatic view showing the operation of one form of machine constructed in accordance with the invention;

Figs. 1ª and 1ᵇ illustrate in plan and elevation respectively the machine;

Fig. 2 is a plan of that section of the machine which is hereinafter referred to as the "coördinator";

Fig. 3 is a front sectional elevation of a portion of Fig. 2;

Fig. 4 is a side sectional elevation also of a portion of Fig. 2;

Figure 5:
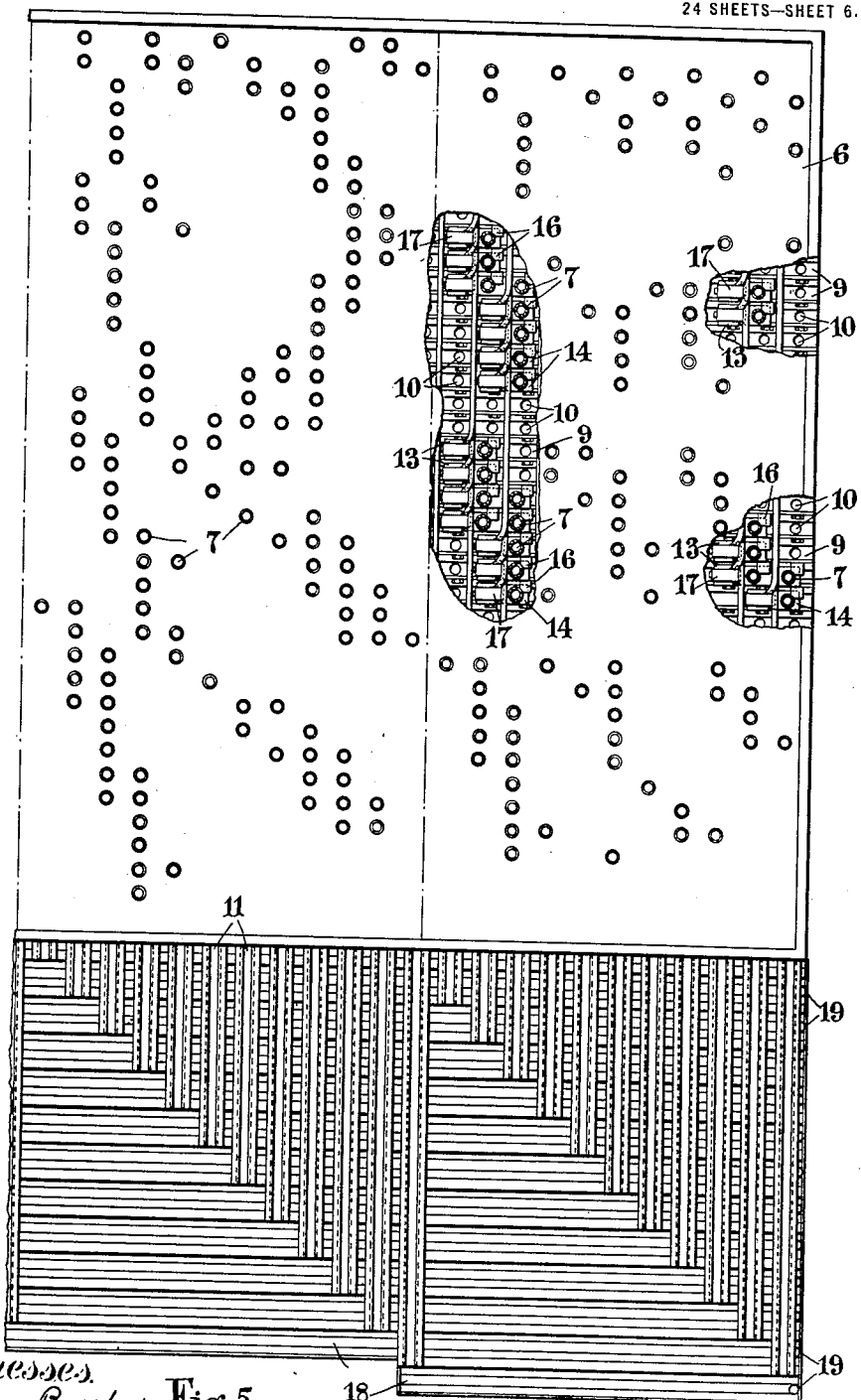
Figure 9:
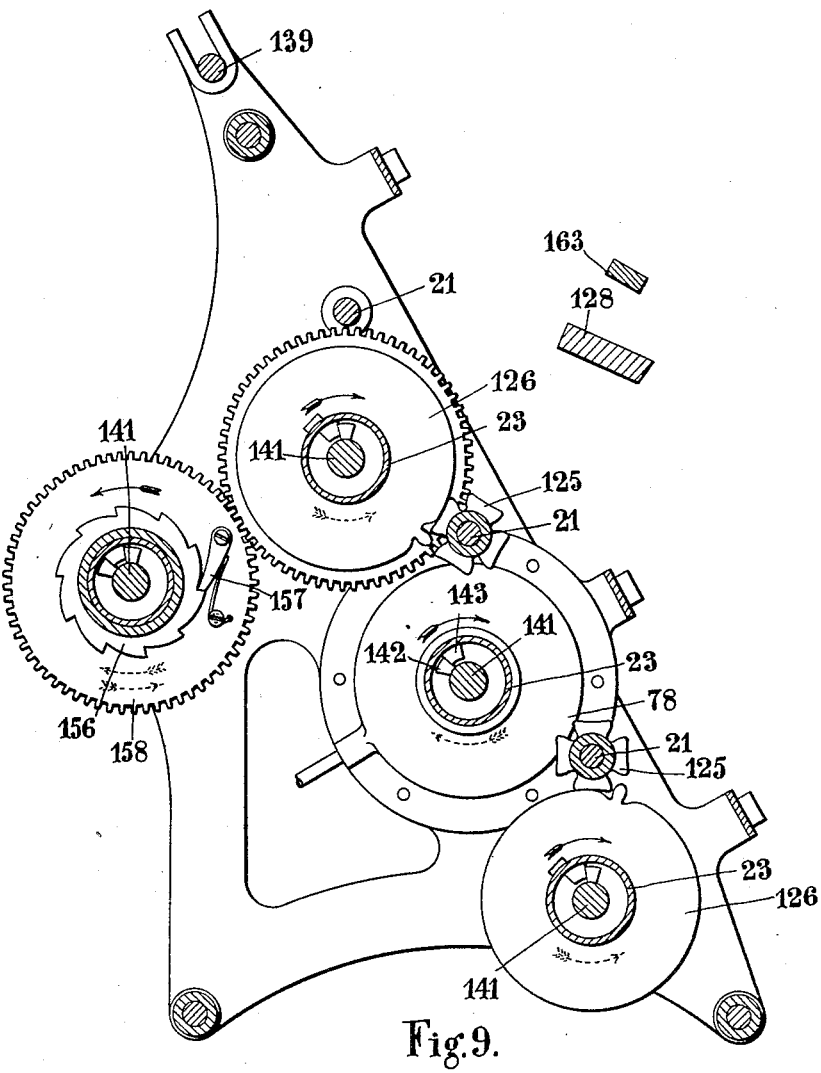

Figs. 5 and 5ª show in plan one convenient form of hopper or receptacle hereinafter referred to.

Figs. 6 and 6ª give a front elevation partly in section of Fig. 5, certain details being omitted for the sake of clearness.

Fig. 7 is an end elevation of Fig. 5 in which also certain of the details are omitted.

Figs. 8 and 8ª show a rear elevation and a perspective, respectively, of one section of a convenient form of counting mechanism which may be employed;

Figs. 9, 10, 11, 12, 13 and 14 are respectively sections on the lines A—B, C—D, E—F, G—H, I—K and L—M of Fig. 8.

Figure 15:
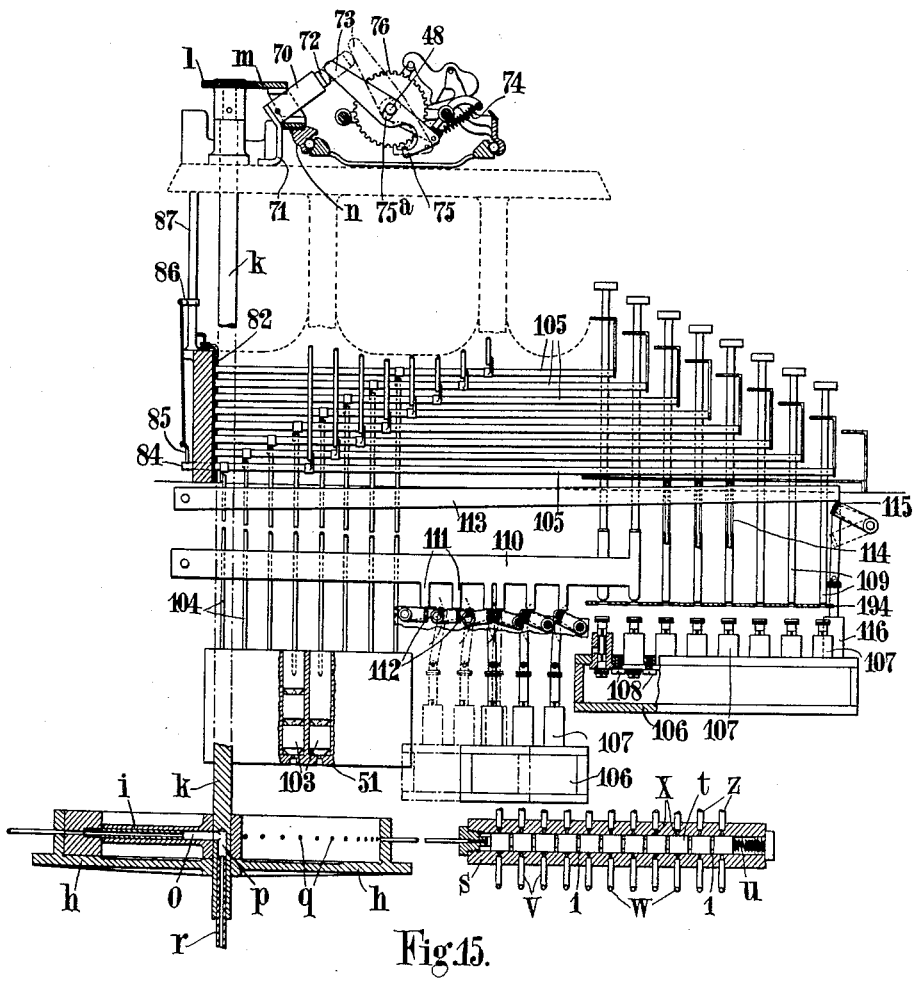

Fig. 15 shows inside elevation partly in section one convenient form of typewriter which may be employed.

Figure 16:
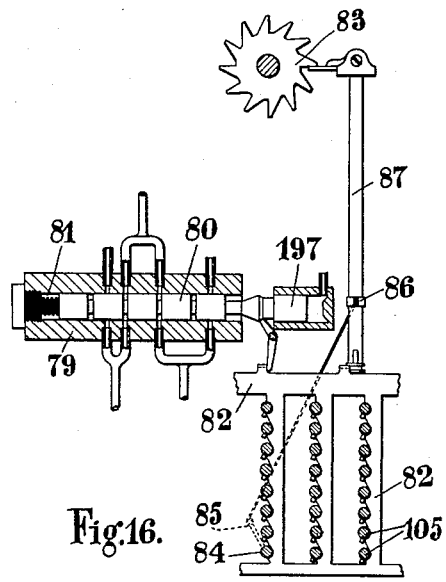

Fig. 16 is a sectional elevation illustrating a detail.

Figure 17:
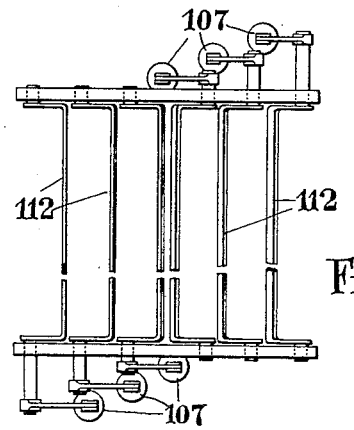

Fig. 17 is a plan of a portion of Fig. 15.

Figure 18:
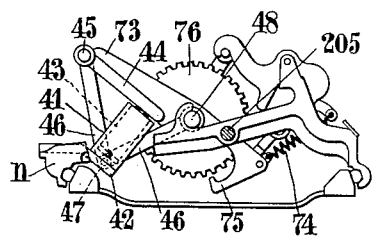

Fig. 18 is an end elevation illustrating a detail.

Fig. 19 is a part sectional plan illustrating a detail.

Fig. 20 is a sectional elevation showing a convenient means for clearing the counting mechanism to zero.

Figs. 21 and 21$^a$ show, in a similar view, a modified form of this mechanism.

Figure 22:
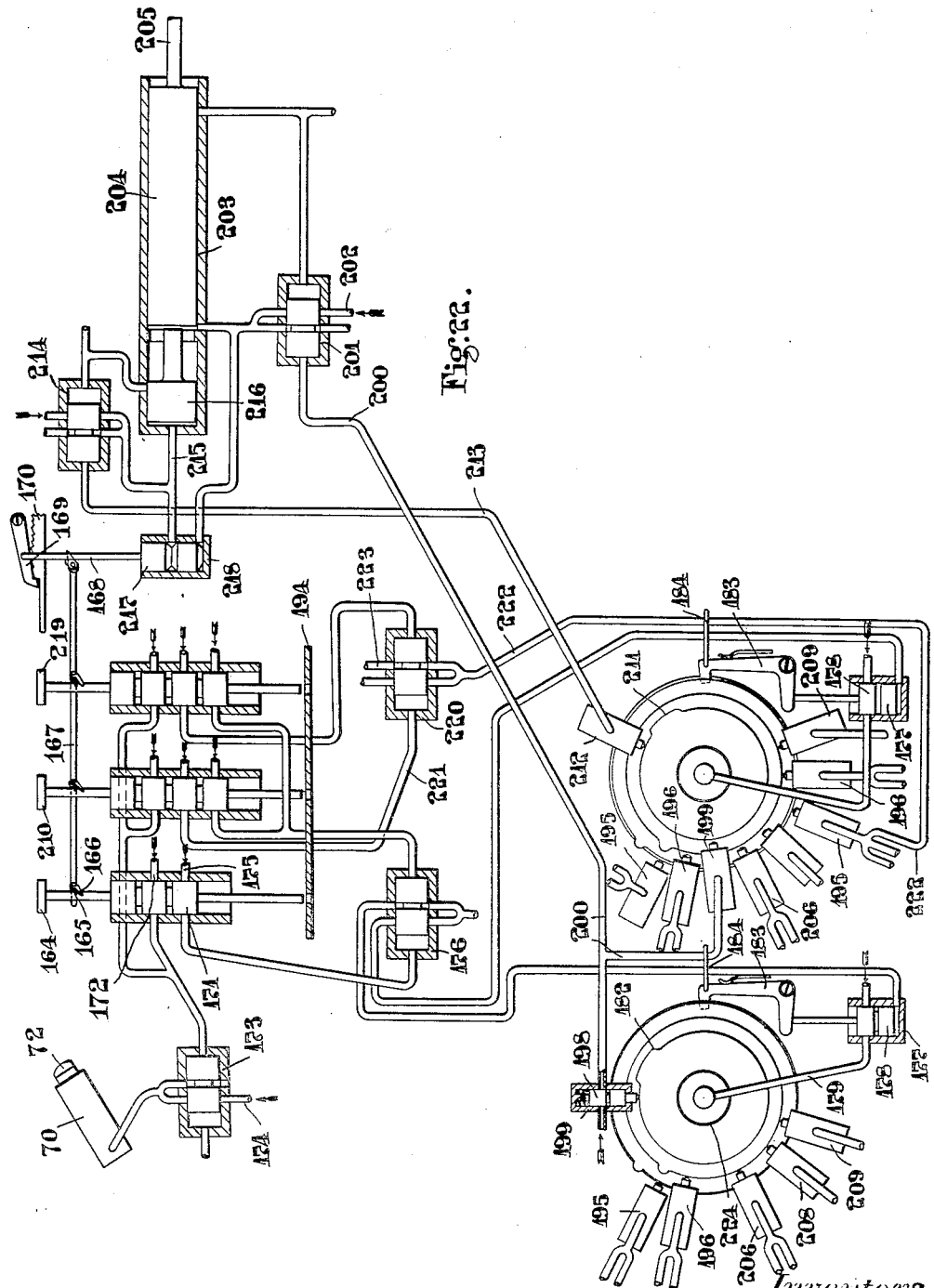

Figs. 22, 22$^a$ and 23 are diagrammatic views illustrating the operation of parts of the machine.

Figure 24:
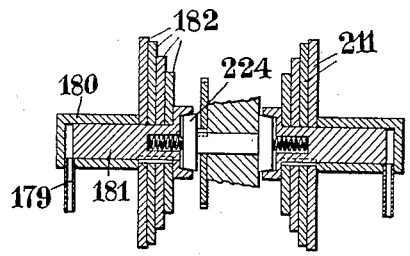

Fig. 24 is a sectional elevation showing a detail of Fig. 22.

Figure 25:
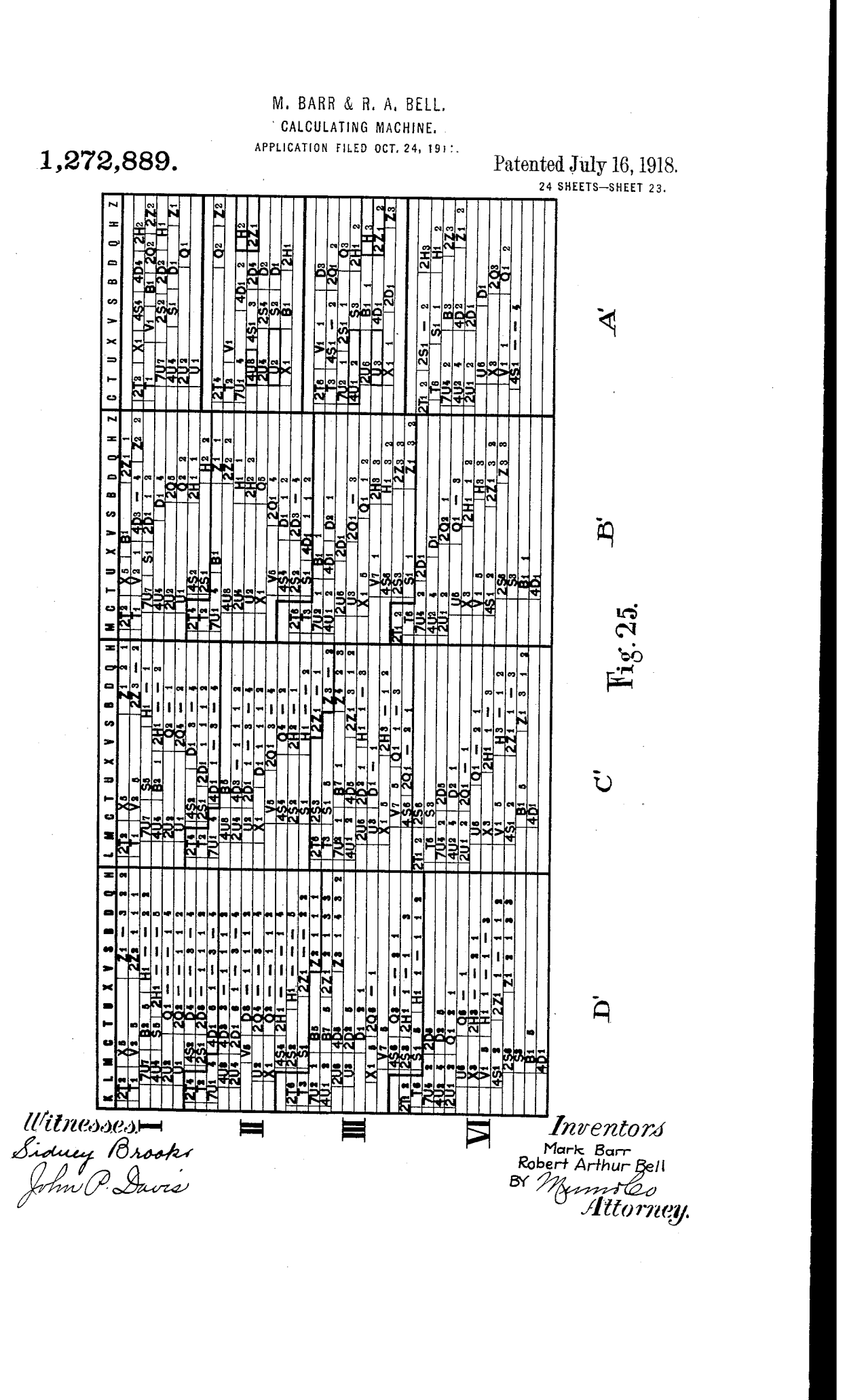

Fig. 25 is a diagrammatic plan of the hopper or receptacle above referred to for the particular machine hereinafter described.

Fig. 26 is a diagrammatic view of pipe connections for printing cylinders and discriminator hereinafter referred to.

In describing one mode of carrying out our invention as in its application to a machine capable of determining the total price of a quantity of things or a number of articles at a certain sum per unit of quantity or per article, it will be convenient to consider a specific machine whose capacity as to quantity or number of articles or what may be termed the item, is up to and inclusive of 9999 by increments of 1, and as to the price or rate, up to and inclusive of £39. 19. 11$\frac{63}{64}$ by increments of $\frac{1}{64}$th of a penny. It will, however, be evident that the invention is not to be confined to these limits as they may be increased or decreased as desired. In the machine under consideration, therefore, there are four possible denominations in the item and seven in the rate, and for convenience and simplicity the following symbols may be employed viz:—

A' denotes thousands of articles in the item
B' denotes hundreds " " " "
C' " tens " " " "
D' " units " " " "
T " tens of pounds in the rate
U " units " " "
X " tens of shillings " "
S " units " " "
P " tens of pence " "
D " units " " "
F " a fraction of a penny in the rate.

In a convenient form of machine we employ any ordinary form of typewriter having a standard keyboard and supplementary keys for fractions from $\frac{1}{64}$th to $\frac{36}{64}$ths in clusive, and by means of the devices and arrangements hereinafter described which we provide in conjunction with the typewriting machine, a machine is produced which, when the line has been typed, will automatically calculate and print the result of the multiplication.

The line in the example under consideration consists of a number of things at a certain price which may be symbolically expressed as A' B' C' D'. Things at T U X S P D F wherein A' B' C' D' represent a row of Arabic natural numbers of any value up to 9999 and T U X S P D F represent tens and units of pounds, tens and units of shillings, tens and units of pence, and fractions of a penny. The complex product of such an expression is equal to the sum of the products of each of the denominational values of the item into each of the denominational-measure values of the rate. These partial products are the elements of the ordinary multiplication table expressed in terms of the coinage dealt with, and in the following description the single symbols will be referred to as elemental items or elemental rates, thus B' is an elemental item, D an elemental rate, and B' D is a partial product. All partial products which can occur within the limits of the machine are predetermined and are represented by grouped numbers of balls arranged in such a manner that upon typing any elemental item value and any elemental rate value the partial product corresponding therewith is found in the machine. Where a number of partial products are to be added the counting of them is performed in such a way that their correct sum is obtained and expressed in terms of the coinage dealt with.

When an elemental item value and an elemental rate value are typed by the machine they are made to coördinate the corresponding partial product, this being accomplished in the simplest form of machine by means of a device which for convenience may be termed "a coördinator" and a convenient form of which is illustrated in Figs. 2 to 4. In this form the apparatus consists of a series of ports or tunnels $a$ employed in conjunction with a series of tubes $b$ in which are located rods $c$, provided with grooves or channels $d$ at intervals in their outer periphery and capable of sliding in the tubes $b$, a convenient arrangement being to place the tubes containing the sliding rods $c$ above and at right angles to the ports or tunnels $a$ so as to correspond to the abscissæ and ordinates of coördination. The tunnels are connected with the tubes by means of ports or short pipes $e$ or other convenient connection while the opposite side of each tube $b$ is provided with a series of passages or openings $f$ to which pipes or tubes $g$ may be readily applied and located at a distance from one another corresponding to the distance between consecutive grooves or channels $d$ in the sliding rods $c$. The tubes and tunnels may be arranged in any desired manner, but for the purpose of the following description it will be convenient to consider a definite arrangement, for example, that in which each ordinate sliding rod *c* (hereinafter termed "a slide" for the sake of convenience) represents one of the rate values and in which each abscissa "tunnel" represents one of the item values. It is clear that when a particular rod *c* is moved along its containing tube a clear passage will be afforded from certain of the tunnels *a* through to the corresponding pipes or tubes *g* so that if by any means a particular tunnel is charged with compressed air when the pipes *g* have been coördinated the compressed air will have a clear path from the particular tunnel *a* to one of the tubes *g* so that the air may pass on to devices hereinafter to be described in such a manner as to release a ball or group of balls having the numerical value or values as hereinafter explained, required by the partial product corresponding to the item value and rate value governing the particular tunnel and slide concerned.

In building up the coördinator above described for the complete machine there is a coördinator for each denomination that the item can contain—units, tens, hundreds and so on. In the most elementary form of coördinator there would be a tunnel for each value that that particular denomination of the item can have,—in the case under consideration 9—and there would be a slide for each value that any denomination in the rate can have but the numbers of slides and tunnels may be provided by using two or more of such slides or tunnels in combination. Obviously any combination such as 1, 2, 4, 7, etc., 1, 2, 3, 5, etc., may be employed and in the particular machine being described the combination 1, 2, 3, 6 is used for the item. Hence there are only four tunnels in each coördinator and the various values that each denomination of the item can have are obtained by using one or two of these tunnels in combination.

```
1 = I        4 = I + III     7 = I + VI
2 = II       5 = II + III    8 = II + VI
3 = III      6 = VI          9 = III + VI
```

The rate is conveniently, though not necessarily built up in the following manner, viz:—

| | | | |
|---|---|---|---|
| $\frac{1}{64}$ | of a penny | = Z | |
| $\frac{1}{32}$ | " " | = 2 Z | |
| $\frac{1}{16}$ | " " | = H | |
| $\frac{1}{8}$th | " " | = 2 H | |
| $\frac{1}{4}$ | " " | = Q | |
| $\frac{1}{2}$ | " " | = 2 Q | |
| 1 | penny | = D | |
| 2 | pence | = 2 D | |
| 4 | " | = 4 D | |
| 6 | " | = B | |
| 1 | shilling | = S | |
| 2 | shillings | = 2 S | |
| 4 | shillings | = 4 S | |
| 5 | shillings | = V | |
| 10 | " | = X | |
| 1 | pound | = U | |
| 2 | pounds | = 2 U | |
| 4 | " | = 4 U | |
| 7 | " | = 7 U | |
| 10 | " | = T | |
| 20 | " | = 2 T | |

There are thus twenty-one slides to each coördinator and these may all be returned singly or in groups as desired, thus the slides S, 2 S, 4 S and V giving units of shillings are conveniently all returned at a single operation as illustrated diagrammatically in Fig. 1 where the cylinders marked 2 (shown in detail in Fig. 4) are illustrated as being coupled together so that the one "blow" serves to operate the pistons 4 of all these cylinders so returning the slides, or such of them as have been moved, to their normal position. In the case of the return cylinders 2 and also the operating cylinders 3 which are exactly similar in construction it happens, for reasons that will be apparent, that several pipes or tubes from different positions will be required to be connected to some of these cylinders. In order to prevent the air from passing from one pipe to another of the pipes connected to the same cylinder we could employ, check or non-return valves, but as these are unsatisfactory in their operation we prefer to make the pistons as illustrated from separate small rods or cylindrical pieces 4 having their ends beveled or chamfered so that they assume somewhat the shape of cylindrical lozenges, the arrangement being such that in the normal position of the valves the grooves are opposite the pipes or tubes 5 supplying compressed air to the cylinders 2, 3, so that when compressed air is admitted through one of these pipes or tubes only that piston or pistons which is or are in front of the particular pipe concerned is or are moved, the pistons behind such tube serving to prevent the passage of air to the remaining pipes or tubes connected to the cylinder.

In the coördinator each of the pipes or tubes *g* may be conveniently known by its particular tunnel and slide as, say C' II, 4 S, that is, C' II, 4 S tube is that tube which is cleared for the passage of air therethrough when the C' II tunnel is filled with compressed air and the 4 S slide blown.

Since the primary supply of air to the tunnels *a* is only momentary and since it may be required to supply air from one of the coördinator tunnels, to several of the devices hereinafter described for the release of a ball or group of balls, a large supply of air in these rows is necessary and for this reason we prefer to interpose a relay arrangement between the pencil valves of the distributer and the rows of the coördinator. One convenient form of such a relay is illustrated diagrammatically in Fig. 1 and in detail in Figs. 2 and 3 where it will be seen that the air from the distributer is introduced into one or other of the cylinders 55 containing a series of separate pistons or lozenges 56, the arrangement being exactly similar to that described in reference to the operating cylinders 2 and 3 of the coördinator slides.

In conjunction with the cylinders 55 we employ larger cylinders or chambers 57 in which are located pistons 58 which in their normal position are adapted to mask the passage between the inlet pipe 59 and the outlet pipe 60 communicating with a tunnel $a$. When, however, air is admitted to the arrangement from the distributer one or other of the pistons 56 is blown and thereby moves the larger piston 58 so that communication is established between the pipe 59 leading from any convenient source of compressed air to the pipe 60 communicating with the tunnel $a$ and in this way it is possible to obtain a large supply of compressed air in the coördinator tunnels as a result of the momentary passage of air.

Since the numerical part of the keyboard of the machine comprises only the ten natural numbers and fractions, it is obvious that the signification of any particular item value typed will depend not only upon its scalar value but also upon its position in the row of Arabic natural numbers. Similarly, in the case of the rate the signification of a digit depends upon its position in the row of digits expressing the rate, thus, for example, it is necessary to distinguish between a tunnel representing eight units and a tunnel representing eight hundred units in the coördinating system for partial products. Owing to the fact that all item digits are referred to a fixed units line in a position on the type-writer carriage the distinctions are represented by the various carriage positions, thus, for example, the eight hundred tunnel (which is $B'=8$) is governed by the key 8 only when the carriage is in a position which makes the figure 8 mean 800 and in no other position. This is equally true of the rate digits, the slide corresponding to ten shillings, (which is $X=1$) being governed by the key 1 only when the carriage is in the position for tens of shillings.

This may be accomplished by a preliminary system of coördination which, for the purpose of distinguishing it from the coördination proper, may be called distribution. The distributer for effecting this preliminary coördination may consist of a series of slides and rows as in the coördinator proper above described, but we prefer to employ the form of distributer illustrated in Fig. 15 and which consists of a circular casing or chamber $h$ within which an arm $i$ is adapted to rotate, the arm $i$ being mounted upon a shaft $k$, the rotation of which is dependent upon the movement of the typewriter carriage. The casing or chamber $h$ may conveniently be fixed to the base of the type-writer upon a convenient bracket or other support while the shaft $k$ carries at its upper end a pinion $l$ adapted to mesh with a rack $m$ fixedly attached to the typewriter carriage $n$ and in the form illustrated the arrangement is such that the pinion $l$ makes two revolutions during the travel of the carriage $n$ from the beginning to the end of its standard line. The arm $i$ is provided with a central bore or passage $o$ communicating with a central passage $p$ in the end of the shaft $k$ and the casing $h$ is provided in its periphery with a number of holes or apertures $q$ to meet the requirements of any particular machine, the arrangement being such that when the pipe $r$ communicating with the bore $p$ in the shaft is placed in communication with a supply of compressed air, the latter is free to pass out through the bore $o$ in the arm $i$ and successively through the holes or apertures $q$ in the casing $h$ as the arm $i$, traveling around its axis in a step-by-step manner depending upon the movement of the type-writer carriage, successively comes into register with the holes or apertures $q$. Adjacent to the casing $h$ and mounted in any suitable manner are a number of what may for convenience be termed pencil valves shown diagrammatically in Fig. 1, and one of which is illustrated in detail in Fig. 15, the number of valves depending upon the number of apertures $q$ in the casing $h$. In the form illustrated each pencil valve consists of a tube or cylinder $s$ closed at either end and containing a rod $t$ controlled by a spring or like resilient device $u$ and capable of sliding within the cylinder. The tubes or cylinders $s$ are provided upon one side with a number of holes or apertures to which pipes or tubes $v$ are fitted, all the corresponding pipes or tubes of the series of pencil valves being connected by a series of tubes or tunnels $w$ shown in section in Fig. 15 and diagrammatically denoted by dotted lines in Fig. 1. The tubes or cylinders $s$ are also fitted with a second series of holes or apertures $x$ connected to pipes $z$, a few of which are indicated in Figs. 1 and 26 and whose function will hereinafter be apparent when the operation of the machine is described. The rods $t$ are provided, as is the case with the slides of the main coördinator, with a series of grooves or channels 1 in their periphery so that the pipes $z$ may be brought into register with the tubes $v$ connected to the tunnels or rows $w$ when compressed air is admitted to the inner end of a pencil valve by way of the arm $i$ of the distributer when the latter passes a particular aperture corresponding to any particular pencil valve.

On looking at the diagram in Fig. 1, it will be seen that the tunnels correspond to the natural numbers and fractions while the pencil valves correspond to the various carriage positions $A^1 B^1 C^1 D^1 T U X S P D F$. When an elemental item value is typed in conjunction with its carriage position an air passage, which controls the corresponding item tunnel in the main coördinator or partial product system is coördinated, and similarly when a rate value is typed in conjunction with its carriage position an air passage controlling the corresponding rate slide in the coördinator is also coördinated. Thus, the required item tunnel and rate slide are each determined by the distributer after which the operation of the item tunnel and rate slide themselves coördinate the partial product corresponding to the elemental item and rate values.

In the carriage position F fractional values from $\frac{1}{64}$ to $\frac{63}{64}$ inclusive may be typed but to obviate the use of 63 tunnels the coördinator is preferably designed so that when any fraction is typed combinations of the values shown under F are employed to build up the value of the particular fraction. When, however, the partial products for fractions are added the printing mechanism hereinafter described prints the correct single character required for the resultant fraction in the product.

The value of the partial product or products obtained by coördinating a slide and tunnel is determined by sets of objects, preferably balls, each representing a unit of a particular denomination and which may be conveniently stored in a hopper or reservoir 6 (shown in Figs. 5-7) and arranged in a suitable position; for example, it may be inclosed in a suitable box or case (not shown) and it may be provided with an inclined or sloping floor or it may be placed in an inclined position in the box or casing referred to. Depending from the hopper and opening thereinto are a number of tubes 7 which are kept filled with balls 8 from the hopper 6 and the lower ends of which are adapted to be moved longitudinally in suitable troughs 9, Figs. 5 and 6, the tubes being supported in any convenient manner as, for example, by means of collars or rollers adapted to slide upon the side walls of the troughs referred to. These troughs are provided with a series of holes or apertures 10 sufficiently large to allow of the passage of the balls 8 therethrough and into troughs 11 arranged at right angles to the troughs in which the lower ends of the tubes slide and corresponding in position to the symbols K L M C T U X V S B D Q H and Z, illustrated in the central portion of the diagram in Fig. 1 and in one or more of which symbols the partial products of a complete product or extension are expressed, each trough 11 being furnished with a flooring strip sloping or inclined downwardly from one end to the other of the trough. The central portion of this diagram represents in effect a plan of a part of the hopper for the particular machine under consideration, the number of balls delivered by any particular tube being denoted in the terms of the symbols set forth in the diagram and which, of course, require to be calculated beforehand for any particular machine. Such calculations have been arrived at with units of English money as the basis, and it will be readily understood that they must be modified to suit any other desired units. Thus upon coördinating any item value with a rate value upon the coördinator sheet the actual number of balls issued to each of the troughs and counters may be obtained as will be illustrated hereafter by means of an example when discussing the operation of the machine. The tubes 7 may be moved longitudinally in their troughs, when required for any particular partial product, either singly or in groups, where circumstances allow of the latter arrangement so that when a particular tube is moved by means of a small piston 12 located in a cylinder 13 supplied with air from a particular tube or pipe $g$ from the coördinator, the lower end of the tube comes into register with its particular hole or aperture 10 and thus allows the particular number of balls which it is designed to deliver to the counting mechanism hereinafter described, to escape through the aperture 10 into the corresponding trough 11. The tube, or where it is desired to move a group of tubes simultaneously, a group of tubes, is held in a slide 14, the end of which is adapted to be moved by the corresponding piston 12 when required, thus causing the tube or tubes to be moved in the manner above set forth for the release of the corresponding number or numbers of balls. The operation is clearly shown in Fig. 6 where a certain number of tubes are shown in their normal position, while the tube marked 15 is shown as having been moved by its particular piston and as allowing the balls 8 to escape into the corresponding trough 11.

It is to be observed that each tube is arranged to release a fixed number of balls and whenever a particular tube is moved from its normal position that fixed number of balls is released to the lower trough, the number being conveniently determined by means of a sluice arrangement 16 consisting of a horizontal plate supported upon an upright standard and adapted to enter through a slit or opening in the corresponding tube when the latter is moved to release the balls, the arrangement being such that all those balls above the sluice plate are held while the tube is in position for releasing the balls and the height of the support for the sluice plate determines the particular number of balls which shall be released by each tube, and it may be here noted that we prefer to employ a horse-shoe shape spring 17 for the purpose of returning each tube or group of tubes to its normal position.

Arranged beneath the troughs 11 is a second series of troughs 18 which are fourteen in number corresponding to the symbols K L M C T U X V S B D Q H and Z and into which the balls from the troughs 11 are delivered, all those troughs 11 corresponding to the symbol K delivering into the K trough 18, all those corresponding to the L symbol delivering into the L trough 18 and so on. The arrangement of the troughs is such that all those tubes which, for example, are to deliver a certain number of balls to the units of pounds counter are arranged over troughs, all of which communicate with a common trough leading to the units of pounds counter, so that the balls from such tubes will simply pass along troughs under the influence of gravity, but by reason of the arrangement of the troughs such balls cannot go anywhere else in the machine but to the units of pounds counter. Similarly, all those of the tubes 7 which are to deliver balls in predetermined numbers to the units of pence counter are arranged over troughs 11 which communicate with one common trough 18 leading to the units of pence counter. There is thus no control of the balls during the operation of the machine other than that which is given by providing one path and one path only from any particular tube corresponding to any particular denomination to the counter of that particular denomination. Each trough 18 is provided with a downwardly inclined or sloping flooring strip (the underside of which is seen in Fig. 7) and at its end with a tube or pipe 19 preferably arranged flush with the end wall of its trough 18 so that there is no risk of the balls becoming stuck. Each pipe 19 leads the balls to a counting mechanism by means of which the balls are counted, there being one counter for each of the symbols K L M C T U X V S B D Q H and Z, while extra counters I J (Fig. 1) may be employed where necessary to receive carried totals.

In an invoicing machine such as is being described it is convenient to have three sets of counters for the product or "extension," the "invoice total" and "grand total" respectively, and one such set of counters with its attendant mechanism is illustrated on a larger scale in Figs. 8 to 14, and it may here be observed that for convenience the counters are so located that the balls operate the three counters of each set or "slice" in succession, the upper counter being for "invoice total", the middle one for the "extension" or product while the lower one is for the grand total.

Each of the series of counters, that is, invoice, total, extension, and grand total counters consists in a convenient form of a four point driving wheel 20 rigidly mounted upon a shaft 21 running the whole length of the series of counters and a toothed wheel 22 mounted upon a tubular or hollow shaft 23, there being a separate shaft 23 for each counter. The driving wheels 20 are driven continuously from some convenient source of motive power at a rate to be determined generally by experiment or calculation and each is adapted to drive its counting wheel only when a ball is interposed between a driving wheel and its counter. The driving wheel may be of any convenient form and it is preferably so designed as to leave its counting wheel in the exact position for the correct approach of the next ball, that is to say, it drives its counting wheel through exactly the required angle although the counting wheel may, if desired, be provided with a spring brake or detent (not shown) to retain it in its correct position.

Each ball passing to a particular set of counters or "slice" enters by the pipe or tube 19, and passing through the passage 24 is carried around by the invoice driving wheel 20 until, striking the corresponding counting wheel 22, it carries the latter around one division. Thence it passes along the passage 25 to the extension driver, and, having driven the extension counting wheel around one division, passes through the passage 26 to the grand total counter and in a similar manner drives the corresponding counting wheel through one division. It then passes to the tail race or trough shown diagrammatically at 27 in Figs. 1, 1ª, whence it may be carried back, by means of any suitable elevator mechanism 28 to the hopper 6. The passages 24, 25, and 26 may be built up of plates as shown in the drawings, or formed in any other convenient manner, while for convenience we place the counters of each "slice" in staggered relation to one another as shown in Fig. 8, which represents a rear elevation of one "slice", and in Fig. 20 each counting wheel 22 is shown as a comparatively thin disk mounted so as to rotate between two disks forming the driving wheel 20.

The number of teeth on the star counting wheels will be varied according to requirements and according as to whether it is required to employ a uniform pattern of wheel. In the example under consideration it would be necessary to provide each counting wheel with 60 teeth if it were desired to have a uniform pattern of wheel. To simplify the construction of the wheels, however, we may employ two or more patterns having a smaller number of teeth. Thus we may employ two patterns, one having ten teeth while the other has twelve. When so many of a denomination have been counted as are equivalent to the next higher denomination, it is necessary to carry one figure to that next higher denomination and this is very conveniently effected according to our invention by passing an additional or "carry" ball to the counters of that denomination, a simple way of effecting this being described below.

The number of times that each counting wheel is adapted to carry during each revolution will depend upon its number of teeth and upon its denomination. Thus, in one example:—

Z H Q D B V and X are 12-tooth wheels; S U T C M L and K are 10-tooth wheels; Z H and Q are arranged to carry three times per revolution; D carries twice per revolution; B V and X carry six times per revolution; U T C M L and K carry once per revolution.

The carrying may be effected in any convenient manner, for example, we may mount upon the extension counter spindle 23 in each slice a disk 29 having one or more teeth or projections 30 thereon (Fig. 14), the number of teeth depending upon the number of times the corresponding counting wheel carries during one revolution. In the example illustrated in Fig. 14 the carrying disk 29, or "carry parrot" as it may be termed for convenience, is provided with only one projection as it is arranged in connection with a counting wheel which only requires to carry once during a revolution. The carry parrot is adapted to rotate within a chamber or casing built up of plates or in any suitable manner and of such a size that there is a circular path 31 between the outer periphery of the carry parrot and the inner surface of the chamber or casing of sufficient size to just allow one of the balls 8 to be carried around by the projection 30 in the direction shown by the full line arrow corresponding to the counting direction of the corresponding counting wheel 22.

The casing or chamber within which the carry parrot 29 rotates is in communication with two tubes 32, 33, the tube 32 serving to convey balls 8 from the hopper 6 while tube 33 leads the carry balls into the invoice counter of the next higher denomination, the ball passing through the several counters in the manner described above in connection with the ordinary counting operation and thus automatically adding one on to the whole set of counters bearing the next higher denomination. We arrange that the tubes 32 and 33 shall at all times be filled with balls and we provide small springs or spring projections 34 or the like situated at the base of the passages 35 communicating with the pipes 32 and 33 in order to retain the balls in their correct position.

Figure 14:
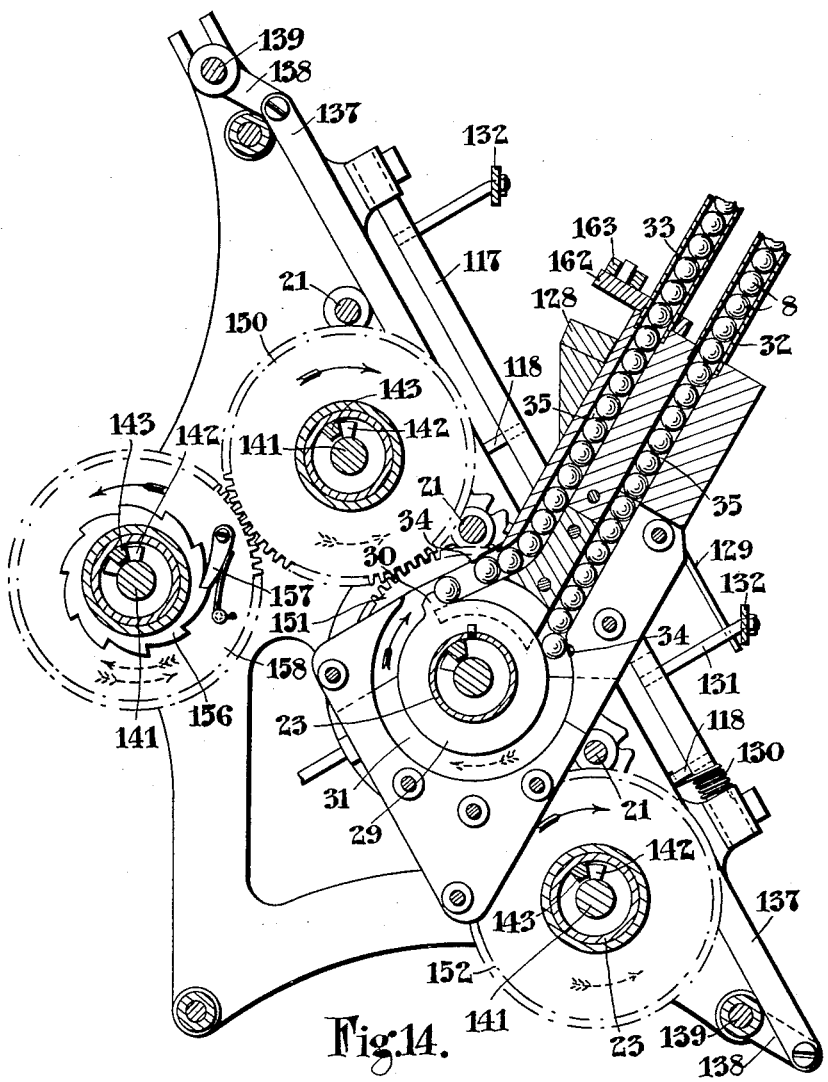

On referring to Figs. 8 and 14, it will be seen that the carry parrot by means of its projection 30 carries a ball around with it and pushes it into the tube 33 so that, as the latter is normally filled with balls, one ball must be pushed from the curved top of the tube 33 (Fig. 8) and be dropped into the tube 224 by which it is guided to the counter of the next higher denomination. Continued rotation of the carry parrot causes the projection or tooth 30 to abstract a ball from the tube 32, the remaining balls being held by the spring projection 34 and the ball which has been abstracted is in due course pushed into the delivery tube 33 when it is required to effect a further carry.

The above is a convenient mode of effecting the carrying operation but it will be evident that the carrying may be effected in other ways, for example, we might employ pins or projections upon the counting wheels to operate triggers or like releasing mechanism so as to open up communication for compressed air to tube valves each of which has a capacity of one and delivers one ball into the counting mechanism for the next higher denomination. As an example, supposing 17 to have been delivered into the H trough the H counting-wheel would make $1\frac{5}{12}$ths of a revolution, it would thus indicate 1 and carry 4 to the Q trough so that the Q counter-wheel would then make $\frac{4}{12}=\frac{1}{3}$ of a revolution and would consequently indicate 0, and carry 1 to the D trough. The D counting-wheel would then indicate 1 having made $\frac{1}{12}$th of a revolution, viz:—

$$H \quad D-Q-H$$
$$17=1-0-1$$

Figure 10:
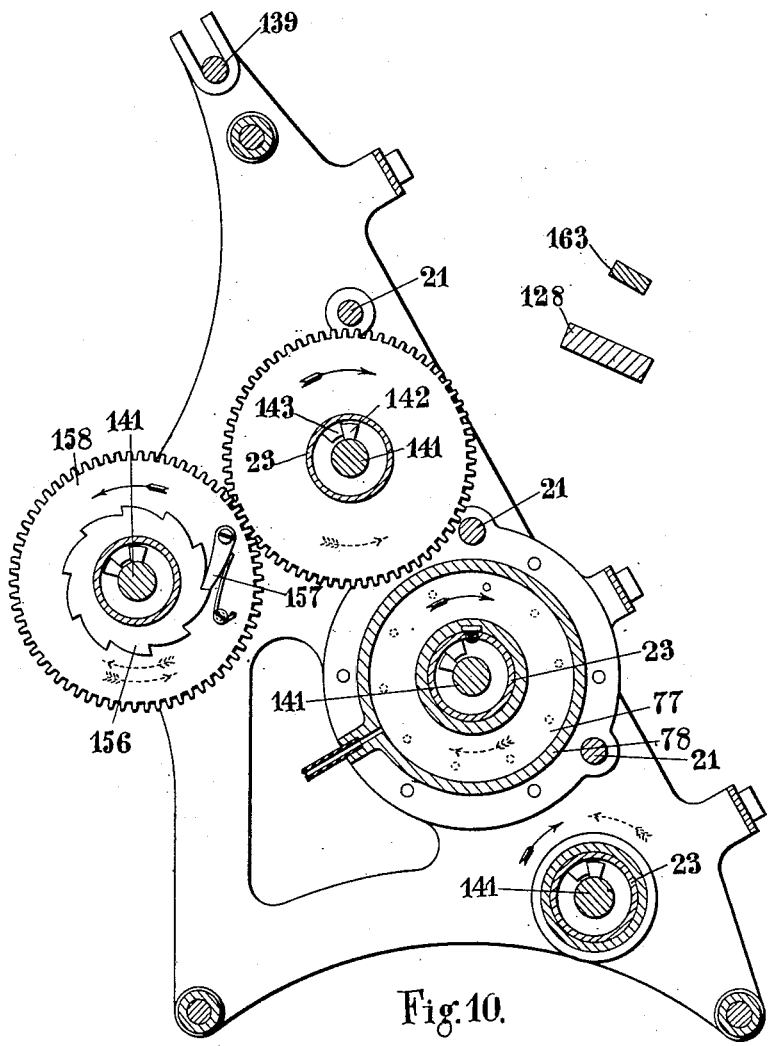

Mounted upon the shaft 23 of the extension counter wheel 22 for each "slice" or set of counters is a disk 77 provided with one or more ports as may be necessary depending upon the particular denomination of the extension counter and adapted to rotate within a circular chamber or casing 78 which for convenience may be termed "a blow-box" and which is illustrated in Fig. 10 and indicated diagrammatically in Fig. 1. The blow-box is mounted in any suitable manner upon the frame supporting the counting mechanism and may be provided upon that side in contact with which the disk 77 rotates with as many ports or openings as its corresponding counting wheel has teeth and which ports may lead directly to printing cylinders or in some cases, if desired, to a minor coördinating system.

The following may be given as examples of convenient blow-boxes and valve disks, viz:—

In the case of the I. J. K. L. M. C. T. and U counting slices the blow-box has ten holes in the seating while the movable disk is provided with a single hole. The blow-boxes for the X V and B slices have two holes in the seating and five in the valve disk. The H Q and Z blow-boxes have four holes in the seating and three in the valve disk; the D blow-box has six holes in the facing and two in the disk and the S blow-box has five holes in the seating and two in the disk, but these numbers are given only by way of example, and it will be readily understood that they may be variously modified as desired. Fractions may conveniently be dealt with by means of the employment in conjunction with the blow-boxes of minor coördinators such as are indicated diagrammatically in Fig. 1 and the function of which will be apparent when considering a specific example of a calculation in which fractions are present and require to be printed. It is obvious that after each extension has been calculated it will be required to clear the extension counters to zero and similarly the invoice total counter will be required to be cleared or wiped to zero when it is desired to print the "carried forward" item upon the invoice, and it will in all probability be required at times to clear the "grand totals" counter and any suitable arrangement for effecting this clearing or wiping to zero of the counters may be effected. The forms illustrated for each of the three counters in the drawings are similar so that it is only necessary to describe one in detail, for example, that required to clear the extension counters to zero.

The device consists of a shaft 141 extending through the whole of the counting wheel shafts 23 for the whole series of extension counters and provided with a key 142 preferably provided with inclined or beveled edges and adapted to engage with a key 143 fixed to the inner surface of the hollow shaft 23, a set of these keys being provided of course for each counter in the series. The shaft 141 (Fig. 20) is adapted to be moved at the proper moment longitudinally, for example, by means of a pneumatic cylinder 144 containing a piston 145 fixed to the end of the rod 141, the latter also being provided with a screw or thread 146 working in a fixed nut 147 so that upon a longitudinal motion of the shaft 141 it also acquires a rotational motion and the key 142 coming into engagement with the key 143 carries the latter around until the extension counter wheel has reached its zero position. It will, of course, be evident that if the counting wheel is already in its zero position the key 142 will simply come into contact with the key 143 at the end of the stroke of the shaft 141 as in this event the counting wheel will not require to be moved.

Figure 11:
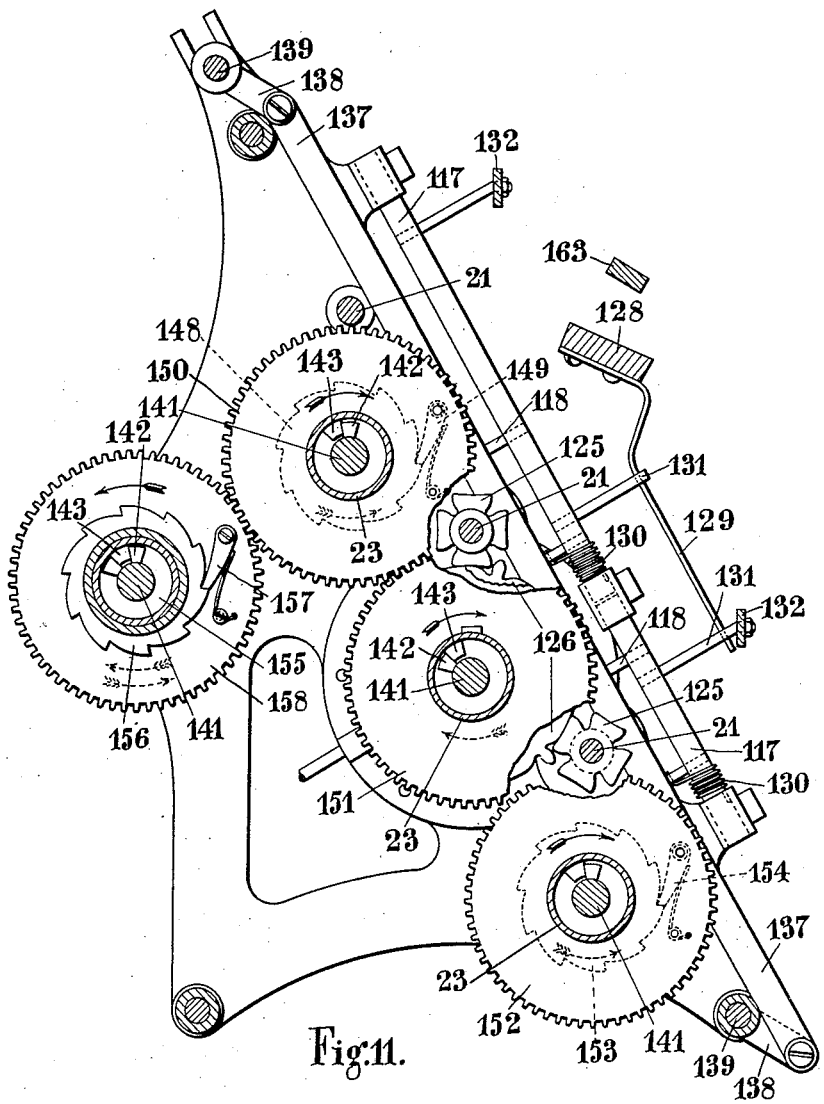

Clearing or wiping shafts for the invoice and grand totals counters are similar to that just described with the exception that they are arranged to clear the counting wheels to zero in a direction opposite to the direction of counting, while in the case of the extension counters the clearing direction is the same as that of the counting direction, these two directions in each case being indicated respectively by the dotted and full line arrows of Fig. 11.

For the purpose of enabling the carried forward total and the invoice total to be printed upon the invoice sheet when required we employ a convenient arrangement of ratchets and gear wheels such as that clearly illustrated in Fig. 11. Mounted upon the invoice total counter wheel shaft 23 is a ratchet wheel 148 adapted to be engaged by a spring-controlled pawl 149 pivotally secured to a toothed pinion 150 loosely surrounding the ratchet or loosely mounted upon the counter wheel shaft. The gear wheel 150 is adapted to engage with a gear wheel 151 mounted upon the extension counter wheel shaft which in turn is adapted to gear with a toothed wheel 152 loosely mounted upon the grand total counter wheel shaft or loosely surrounding a ratchet wheel 153 mounted upon the grand total counter wheel shaft and adapted to be engaged by a spring-controlled pawl 154 pivotally secured to the gear wheel 152. For the purpose of enabling the invoice total to be copied at any particular time we provide a shaft 155 mounted in the framing of the counter mechanism upon which is mounted a ratchet wheel 156 adapted to gear with a spring-controlled pawl 157 pivotally carried by a toothed wheel 158 adapted to engage with a gear wheel upon the same shaft as the gear wheel 150. When it is required to print the "carried forward" total the invoice total counter mechanism is cleared or wiped to zero by the apparatus above described, and it will be seen that the gear wheel 150 is rotated in a counter clockwise direction through the medium of the ratchet 148 and the pawl 149, and thus transfers the invoice total to the copying counter mechanism 158 and at the same time turns the extension gear wheel 151 in the counting direction so that the carried forward total or the invoice total for the particular moment under consideration is transferred to the extension counter and thus the blow-box or boxes upon the extension counter shaft are set in a position to print the invoice total in a similar manner to that described with reference to the extension total. In a similar manner the grand total may be printed at any moment. When it is required to continue with the invoice after having printed the "carried forward" total the copying mechanism is cleared to zero in a counter clockwise direction whereupon the invoice total is again set up on the invoice total counter, and when it is desired to clear the copying total to zero without affecting the other counting mechanisms this must be done in a clockwise direction so that the ratchet 156 underrides its pawl 157. It is thus evident that the copying mechanism must be capable of being cleared or wiped to zero in both directions and this is conveniently effected by a form of clearing mechanism such as is illustrated in Figs. 21 and 21ᵃ where the piston 159 moves the clearing shaft 141 in one direction and thus through the medium of the screw 146 and the nut 147 effects the clearing in one direction while upon moving the shaft in the reverse direction the clearing in the reverse direction is effected, suitable springs 160 and 161 being employed for the purpose of returning the clearing spindle and consequently the piston 159 to its mid-position. It will be noted that as the extension counter is always cleared to zero in the forward direction or direction for counting it will, when so cleared, always cause the carry parrot 29 to carry a ball into the tube 33 and unless means were adopted for preventing it this ball would be passed into the counting mechanism of the next highest denomination as above described. For the purpose of avoiding such a contingency we provide an extra bar 163 (Figs. 13 and 14) with which are connected a number of cranks 162, each of which is rigidly secured to its corresponding tube 33. Each tube 33 is adapted normally to deliver its carry balls into the tube 224 leading to the counter of the next highest denomination but at the moment that the mechanism for clearing the extension counter is operated the bar 163 is also moved so that the tubes 33 are rotated upon their axes until their exit openings come into register with a series of tubes 225 leading to the tail-race.

It will be seen then that in the event of a particular extension counter being cleared to zero the additional carry ball which would otherwise be delivered to the counter of the next highest denomination is discharged into the corresponding tube 225 and thence to the tail-race while if any particular extension counter is already standing at zero and therefore does not move when the clearing shaft is operated the corresponding tube 33 will simply be rotated upon its axis but no ball will be delivered therefrom.

In addition to the carry mechanisms for the ordinary counting above described it will be seen that the summation or the accumulation of the invoice total and of the grand total will necessitate carries in each of the invoice and grand total sets of counters which carries, however, must not be transmitted to the extension counters.

It is a mathematical fact demonstrable by an algebraic calculation that the invoice and grand total counters will either not require any carries in addition to those which they receive during the counting operation, or, in the alternative, they will need only one such carry. To illustrate: Let any series of partials enter the extension counters and at the same time be discharged into the totalizer counters.

At the beginning of the count all extension counters stand at naught and therefore the number of carries that take place in any given counter depends upon what multiple of 10 (in the case of decimal counters) most nearly equals, but is less than, the number of balls in the respective group of partials. If the number of balls is exactly a multiple of ten, the respective counter will ultimately stand at naught and it will have carried to the counter of next higher denomination a number of times equal to one tenth of the balls counted. If the number of balls equals a multiple of 10 plus a remainder the respective counter will ultimately register the remainder number and the number of carries will have been as stated above.

This applies to all partials counted whether decimal or not; for example, to a pence counter, in which case the number of carries depends upon what multiple of 12 (instead of 10) most nearly equal to, but less than, the balls counted.

The result of passing any number of partials and their resultant carries through the extension counters is to communicate to them certain angular positions which represent the properly denominationalized values of such partials.

The result of passing the same partials through either of the totals counters, with their carries as above, is to communicate to them exactly similar angular motions to those given to the extension counters with the result that if the totals counters were at the beginning of count, standing at naught they would register, at end of count, the same properly denominationalized values of the partials as registered by the extension counters. And the ultimate angular position of a given counter (e. g. decimal) cannot differ by more than 9 from its initial position.

But if any or all counters of either totalizer should stand at significant figures at the beginning of a count, then any angular motion given to a counter may or may not cause that counter to carry, and no totals counter (e. g. decimal) can at the beginning of a count stand at a greater value than 9; and since (as explained above) no counter can have its angular position changed by a count and by carries by more than 9, the ultimate position of a totals counter cannot be such as to have been through a greater angular change than 9+9 or 18. This latter angular motion can only cause or require one carry.

And if a totals counter stands initially at zero or at such a number than when a new count is added, it has not changed its angular position enough to carry in relation to the first position and its second position due to new count, there will be no excess of the nominal carries due to the passage of the partials themselves.

Therefore totals counter either requires one extra carry or no extra carry. A convenient form of apparatus for determining whether such carry is necessary and for effecting the same if required is illustrated in the drawings.

Figure 12:
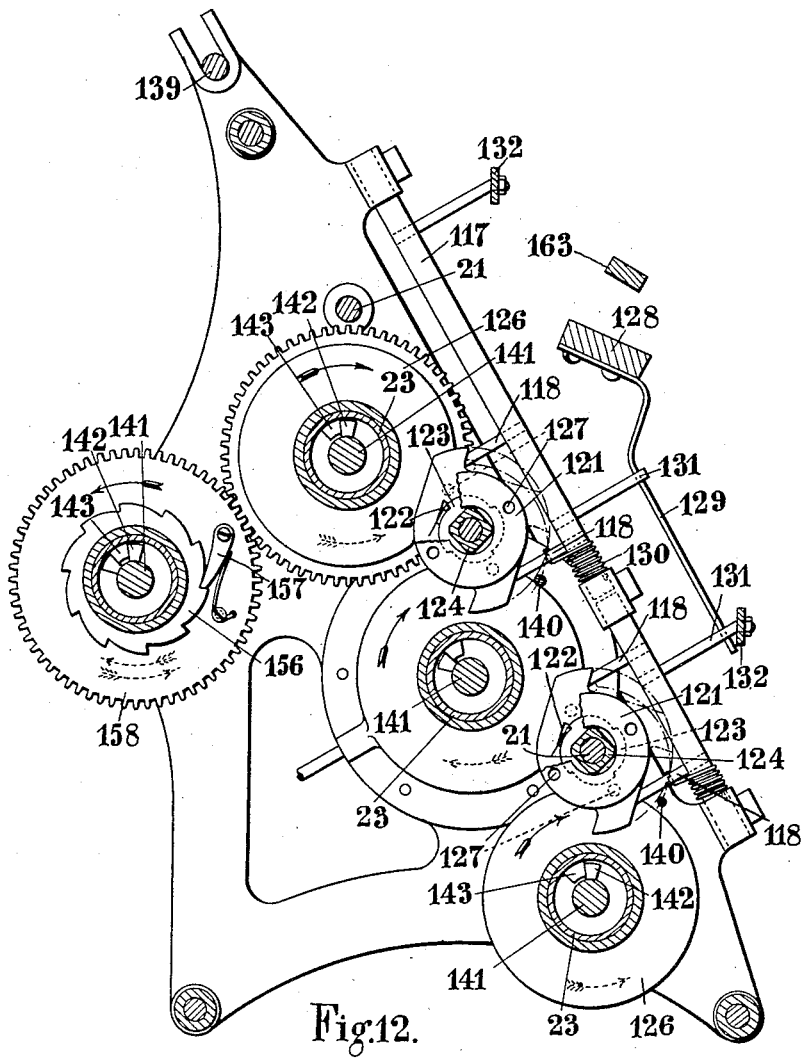
Figure 13:
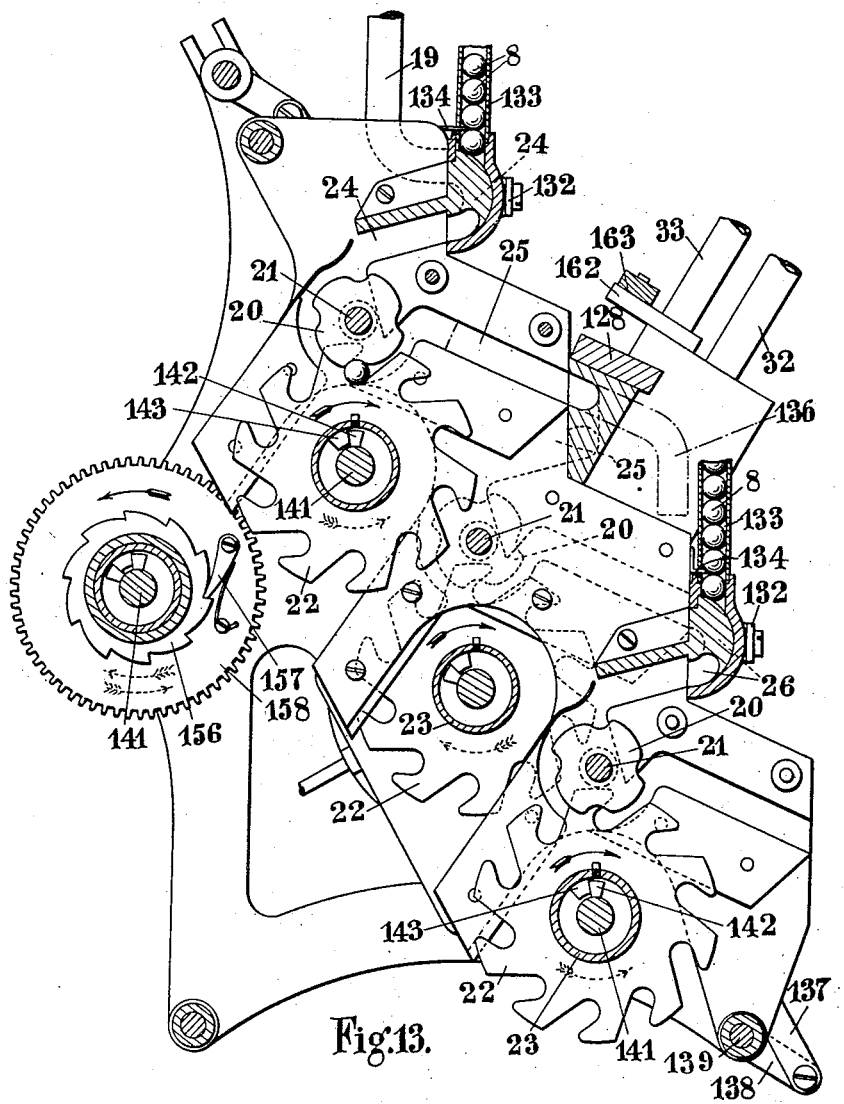

It is to be understood that the counting mechanism may be supported in any convenient form of framework, and rotatably mounted upon the frame in a suitable position is a pair of shafts or spindles 117, each of which is provided with a pair of depending arms 118 or a strap connected with a grooved disk 119 or other suitable form of slide loosely mounted upon the driving wheel shaft of the extension and grand total counters respectively. The slide 119 is provided with a pair of pins 120 adapted to be pressed into contact with one of a pair of disks 121 conveniently formed with projecting cam-like surfaces as shown in Figs. 8 and 12, each disk being connected by means of a pawl 122 engaging with a four-toothed ratchet 123 to a square sleeve, 124, loosely mounted upon the driving wheel shaft 21. Rigidly connected to or formed integral with each square sleeve 124 is the four-point wheel or "geneva" 125 shown more clearly in Fig. 11, each geneva 125 of one set being adapted to be driven by means of a driving wheel 126, which has as many points or teeth as there are teeth on the carry parrot for that particular "slice", one of such driving wheels being rigidly mounted upon the shaft of the invoice counting wheels while the other is mounted upon the shaft of the extension counter wheels, this arrangement being for the invoice extra carry while in the similar arrangement employed for the grand total extra carry one of the driving wheels 126 is mounted upon the grand total counter shaft while the other is mounted upon the extension counter shaft. Considering the arrangement with respect to the invoice total counter the driving wheels for the four-point wheels or genevas 125 are driven around in a step-by-step manner during the counting operation so that the genevas are correspondingly moved and with them by the intervention of the pawl and ratchet mechanism 122 and 123 the disks 121 are also moved alternately out of and into register with one another. The disks 121 are provided with holes or apertures 127 large enough to receive the pins 120 and arranged so that in the normal or starting position of the disks 121 the holes are out of register with one another so that it is only possible to move the slide 119 to a certain extent as its further progress is arrested by the pins 120 coming into engagement with the second of the disks 121. Owing to the mathematical fact above stated, at the end of any series of operations the invoice counter will either not require any extra carry or will only require one extra carry, and it is the function of the shaft or spindle 117 to determine whether such a carry is necessary. At the proper time, which time will be determined hereafter, a bar 128 which is provided for each counter with an arm 129 normally preventing rotational movement of the spindles 117 due to the torsional action of the springs 130 by the engagement of the arm 129 with pins or rods 131, is moved longitudinally in the counting mechanism so that the spindles 117 are free to turn under the influence of their springs thus moving the slides 119 along their shafts and causing the pins 120 to move into the apertures in the disks 121. If the apertures in the disks are out of register this is an indication that no extra carry is required and everything remains in its normal condition. Should the holes, however, be in register with one another this is an indication that a carry is required by a particular invoice or grand total counter, and additional movement is allowed to the spindle 117 depending upon the distance between the slide 119 and the disks 121 and this additional movement is sufficient to effect the extra carry in the following manner, viz: Attached to one of the pins 131 upon the spindle 117 is a link or bar 132, the other end of which is secured to a tube 133 (Fig. 13) adapted to supply balls when required to the invoice counter of the next higher denomination which is kept filled with balls from the hopper and which is so positioned that the balls are normally kept out of the path leading to the invoice counter. When, however, a carry is required and the bar 132 is moved the tube 133 is also moved the required distance to allow a ball to drop into the passage leading to the invoice counter so that the counter of the next higher denomination receives a carry and is rotated through one division, the sluice plate 134 being provided in a similar manner to those described in connection with the hopper mechanism for insuring that not more than one ball shall escape at a time into the counter. At the same time provision must be made for securing the ejection of the extra carry ball before it reaches the extension counter and this is conveniently effected by means of the device shown in Fig. 19, where the bar 128 is connected through the medium of a spring 135 to a tube 136, the end of which is normally out of the path leading from the invoice counter to the extension counter but which, when the throwout bar operates, is moved into the position shown in dotted lines in Fig. 19, in which position the extra carry ball is intercepted and thrown out to the tail-race before it passes through the extension counter.

For the purpose of returning the disks 121 to their normal position when required after an extra carry has been performed, we provide a bar or link 137 pivotally connected at its ends to cranks or levers 138 rigidly connected to or mounted upon shafts or spindles 139 pivotally carried by the framing of the counter mechanism. The bar 137 carries pins 140 (Figs. 8 and 12) which, when the bar 137 is moved in a longitudinal direction by means of any convenient arrangement of pneumatic cylinders and pistons, sweep over the exterior surfaces of the disks 121 and engaging with the cam-like projection upon one of the disks moves it around until it comes into register with the other disk so that the holes in the disks are out of register.

It may be well at this point to consider a convenient form of type-writer which we may employ in combination with our improved calculating machine but it is to be clearly understood that our invention is not to be limited to any particular type of machine and also that the details of construction and the various arrangements may be suitably modified to suit the varying types of machine with which our invention may be employed.

As above mentioned the type-writer is provided with a standard keyboard to which are added keys for all the frictions from $\frac{1}{64}$ to $\frac{63}{64}$ but in order to reduce the number of type levers we may employ certain type levers indicated diagrammatically at 36 in Fig. 1, fitted with a pair of type shoes 37 which may represent either a small letter or capital or a letter and a numeral but in no case do we arrange two numeral impressions upon the one type lever. Thus, for example, in the set indicated on the left-hand side of the diagram in Fig. 1 the type shoes may represent the figure 5, and the letter q, while the key 38 is the 5 key and the key 39 is the q key. The use of two type shoes upon the one lever necessitates the employment of a form of shift mechanism for moving the type-writer roller 40 and this automatic shifting we may effect conveniently by means of a small pneumatic cylinder and piston operated by means of compressed air, a suitable mechanism being illustrated in Fig. 18. The cylinder 41 mounted upon a bracket 42 contains a piston 43 adapted to bear against a lever 44. The lever 44 is pivoted upon a shaft 45 which is pivoted to some convenient part of the framing of the machine or to a bracket thereon and which also carries a toggle arrangement consisting of two levers 46 pivoted at 47, one of which bears against the shaft 48 of the type roller 40, the arrangement being such that when compressed air is admitted to the cylinder 41 the piston 43 is forced outward, and through the medium of the lever 44 and the toggle 46 moves the type-writer roller bodily so that by this means one or other of the type shoes 37 may be brought into a position for operation as desired.

Upon referring to the diagram in Fig. 1 it will be seen that when the key 38, that is the 5 key, is pressed, air will be admitted from the pressure pipe 49 by means of the valve 50 to the cylinder 51, the piston of which operates the type lever 36 and causes the 5 to be printed. When, however, the key 39 is depressed air is admitted as before from the pressure pipe 49 through the valve 52 to the shift cylinder 41 thus moving the typewriter roller 40 so that the type q is placed in position for operation while the air is subsequently admitted to the printing cylinder 51 this bringing the type q into operation.

One convenient method of effecting this is shown in Fig. 15 in which a pivoted arm or lever 113 is adapted to pass through slots 114 in each of a row of shift keys, the outer end of the lever 113 being adapted to bear upon a pivoted cross-arm 115 similar to the arms or cranks 112. The arrangement is such that upon depressing one of the shift keys the corresponding lever 113 is depressed and depresses the crank or arm 115 into the dotted position shown in Fig. 15 thereby opening a valve 116 to admit compressed air to the shift cylinder so that the latter is moved for the purpose of bringing the second of the type-shoes on the type lever corresponding to the shift keys depressed into operation.

Details of the printing cylinders and their attendant parts and pressure boxes with convenient forms of valves therein are illustrated in Fig. 15 by way of example, but numerous modifications will suggest themselves to those skilled in the art. In the form illustrated the printing cylinders 51, which have already been described, consist of cylinders within which are located a series of short rods or pistons 103 being beveled as described in connection with the operating cylinders for the coördinators and valves and the uppermost piston is connected by means of a rod or link 104 with a crank upon the rod 105 of a particular type-lever corresponding to the printing cylinder concerned so that when one of these cylinders is blown, as will hereinafter be described, the corresponding type-lever is operated through the medium of the pistons 103, rod or link 104, and crank connecting the same to the spindle or shaft 105.

The compressed air required for the operation of the machine may be provided in any suitable manner, as for example, by a convenient power-driven compressor and may be stored in one or more pressure boxes or chambers 106, pressure boxes for the keys being illustrated in detail in Fig. 15. Located in the cover of this pressure box are a number of valves 107 conveniently held in position in the cover by screws 108 and which may be of any suitable form to suit any special requirements. The forms shown are adapted to be depressed by the lower ends of the key rods 109 and they may be spring-controlled although this is not necessary in the particular example given seeing that they are normally held in their outer position by the pressure of air on the under side. In the case of the fraction keys it is convenient to insure that the movement of one key depresses the valves corresponding to the particular fractions from which the key fraction may be built up simultaneously and this may be effected in one convenient manner by means of rods or levers 110 fitted with depending members 111 placed in the correct position for operating the particular valves required and fractions from $\frac{1}{64}$ to $\frac{64}{64}$ may be built up from combinations of the fractions $\frac{1}{2}, \frac{1}{4}, \frac{1}{8}, \frac{1}{16}, \frac{1}{32}$ and $\frac{1}{64}$ we provide six arms or levers 112 corresponding to these particular fractions and their valves and which are adapted to be depressed as required by the combinations of depending pieces 111 of the key levers 110 so that in this manner any combination of valves corresponding to any fractional key value concerned may be operated by depressing the key.

A special key, hereinafter termed the "extension key," provided on the keyboard of the type-writer, being depressed causes the carriage to move into the printing zone and the printing of the product or extension found by the machine takes place, but owing to the fact that time is required for the performance by the machine of the various calculating operations it will be understood that we make it convenient for the machine to perform such calculations for one line of the invoice while the operator is engaged in typing the next line and when the carriage has moved into the printing zone, after the extension key has been depressed, the printing of the extension or product for the previous line of the invoice takes place, automatic shifting mechanism being provided for moving the type-writer roller into the position for printing upon the previous line. One convenient form of such shifting mechanism is illustrated in Fig. 15 in which a cylinder 70 mounted upon a bracket 71 on the type-writer frame contains a piston 72 adapted to bear upon the end of a lever 73 controlled by a spring 74 and provided with a curved slot 75 adapted to embrace the shaft or spindle 48 of the type-writer roller 40. The lever 73 is provided at one end with a pawl or tooth 75 adapted to be engaged, when required, with a circular rack 76 fixed to the type-writer roller or its spindle, and it will be seen that when air is admitted to the cylinder 70 the piston 72 is moved outward and thereby causes the pawl 75 to come into engagement with the circular rack while further movement of the piston will cause the type-writer roller to move through the desired amount so that the product or extension may be printed upon its correct line on the invoice sheet.

The printing of the product or extension is effected by means of that part of the before-mentioned distributer which corresponds to the type-writer carriage positions for the particular value of the digits of the product or extension to be printed. The inner tunnel or row 89 (Figs. 1 and 26) on the printing distributer, which is in all respects similar to the typing distributer, being connected with a supply of compressed air, the latter passes, when a particular pencil valve is blown by the distributer arm $i$, by means of the corresponding tube $z$ to one of the blow boxes 78, depending on the numerical value of the pencil valve blown, and through the ports which are in register in the said blow box back to the pencil valve already blown through which it passes to one of the outer rows $w$ of the distributer, depending on the digital value of the blow box part in register. Each of the outer rows $w$ is connected to a particular printing cylinder which, as already described, operates a type lever, to print the number represented by the particular row coördinator and by naturals at the ends of the rows on the drawings.

Any convenient arrangement may be adopted to insure that naughts shall be printed only when they occur after a significant digit or on the right of a significant digit. For example, we may employ a device which for the sake of distinction may conveniently be termed "a discriminator" illustrated in Figs. 16 and 26 in detail and diagrammatically in Fig. 1. In this form the device consists of a cylinder 79 provided with sets of ports as shown and containing a grooved or channeled piston 80 adapted to be controlled by a spring 81. In the normal position of the piston 80 there is a clear passage for compressed air from the naught point in any particular blow-box to the cylinder which operates the spacing lever so that when naughts occur to the left of a significant digit the space lever of the typewriter is operated and the carriage is therefore spaced without any print occurring. As soon, however, as a significant digit has been printed the plate 82 or other spacing mechanism which is usually employed upon a typewriter for moving the escapement device 83 to allow of the carriage moving when a figure has been printed, is moved in the ordinary way, and consequently allows the rod or piston 80 to move under the action of the spring 81 in such a manner that the naughts of the blow-boxes are now connected with the printing cylinder operating the zero type lever while the passage to the spacing cylinder is closed so that whenever a naught occurs it will be printed. The device may also be employed as will be obvious for the printing of commas for the thousands when large sums are to be printed. In most type-writers it is usual for the spacing lever, in addition to the key levers, to operate the plate 82 or other spacing mechanism for the purpose of allowing the escapement 83 to come into operation but according to our modification we provide the spacing rod 84 with a separate lever 85 connected in any suitable manner to a rod or lever 86 upon the pillar or shaft 87 for the escapement device.

When the operator has completed the typing of the invoice line including the item, text, and rate, should any error have occurred in the typing the carriage may be moved back to the position for typing the correction and upon depressing a correction key which may be red in color or of any other distinctive color or form so as to be easily distinguishable from the ordinary keys, the parts of the machine which had previously been incorrectly set for performing the calculation will be returned to their normal position and upon erasing the incorrect figure and typing the corrected figure the machine will again be set in position for performing the correct calculation. The correction key is illustrated diagrammatically at 63 in Fig. 1 and it will be seen that, should a mistake have occurred in the typing, for example, in typing a figure in the item when the carriage was in the D' position, upon depressing the key 63 compressed air will be admitted from the pressure pipe 64 through the valve 65 and by way of the pipe or tube 66 to an additional tunnel indicated by the dotted lines 67 in the pencil valves and as the distributer arm is opposite the D' pencil valve the aperture marked with a star will be opened for the passage of compressed air which is led by means of a suitable pipe or tube 68 to the return cylinders 69 operating the pistons 58 of the valves 57 and in this way those tunnels in the coördinator which had previously been incorrectly opened will now be closed and, upon typing the correct numeral, the proper tunnels corresponding thereto will be opened as above described in the ordinary operation of the machine. When the operator has finished typing a line and arrives at a fixed point which may be termed "the rule" it is his or her duty to depress the extension key already described and after this has been done no correction will be possible in the line and the machine would then reproduce the incorrect calculation corresponding to the incorrect typing occurring in the invoice so that it would be evident that the mistake had been made upon the part of the operator and not by the machine.

Figure 23:
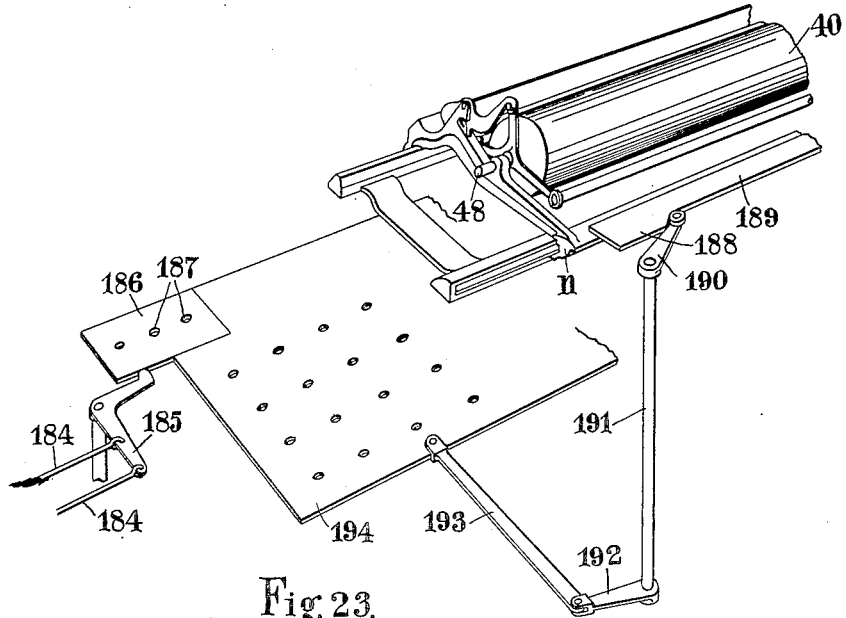

The timing of the apparatus must, of course, be adjusted to suit the requirements of any particular machine and it can always be arrived at in a simple manner when the maximum modulus or number of balls likely to pass through the counting mechanism at one time is known, as the time occupied for the passage of these balls can be determined by experiment and if a suitable margin is left no trouble should be found with regard to the smooth and regular operation of the machine. Figs. 22, 23, and 24 illustrate diagrammatically suitable timing and locking arrangements to enable the machine to perform its functions readily and smoothly without any fear of being overrun by the operator. Considering first the case of an ordinary calculation it will be remembered that when the operator has completed the typing of an invoice line the extension key must be pressed. The extension key is represented at 164 and it will be seen that upon depressing this key the pin 165 engages with a lever 166 upon a rod 167 whereby the latter is rotated and is caused to raise the rod 168 carrying the pawl 169 so that the latter is free to ride over the ratchet 170 carried by the type-writer carriage. At the same time the grooved piston 171 is depressed so that compressed air may pass from the pressure pipe 172 to a relay 173 which, upon being blown, admits air from the pressure pipe 174 to the shift cylinder 70 whereby the type-writer roller is placed in the correct position for printing the extension or product of the previous invoice line. At the same time pressure is also admitted from the pipe 175 to the relay 176 which in turn admits air to the cylinder or relay 177 whereupon the piston 178 is raised so that air is admitted to the pipe 179, Figs. 22 and 24, to the cylinder 180 and so causes the engagement of a clutch 181 carrying a series of cams 182 with a revolving clutch 224 so that the cams 182, also shown in Fig. 22, are caused to rotate, their rate of rotation being determined by the rapidity of action of any particular machine, which can be easily ascertained in the manner above set out. Immediately the cams commence to revolve the spring-controlled bell crank lever 183 is pushed out of engagement with its notch upon one of the cams and by means of the rod 184 and the bell crank lever 185 pushes the small plate 186 (Figs. 22 and 23) which normally allows the depression of the extension carried forward and invoice total keys by means of the apertures 187, into such a position as to obstruct these keys so that the extension key cannot again be depressed until the bell crank lever 183 once more enters its notch in the cam, in which position it is shown in Fig. 22. At the same time upon reference to Fig. 23 it will be seen that projection 188 upon the cam plates 189 causes the lever 190 to rotate at the moment the carriage enters the printing zone and through the medium of the shaft 191 and the crank or roller 192 connected by means of the link 193 to a plate 194 (Figs. 15 and 23) causes the plate 194 to obstruct the path of the key rods 109 so that it is impossible for the operator to depress any of the keys of the machine while the carriage is in the position for printing the extension. The cams 182 are provided with pips or projections upon their external peripheries suitably designed and positioned to allow of their functions being performed at the proper times and these pips or projections are employed to operate the pistons of small relay cylinders surrounding the cams and supplying compressed air in turn to other relays performing various functions in the machine, thus the cylinder 195 which in the arrangement being described is the first to come into operation admits air to the cylinder 144 (Fig. 20) in order to operate the wiping or clearing to zero of the extension counters and also to the cylinder which operates the arrangement for returning the disks 121, Fig. 8, to their normal position, while, at the same time, air is admitted to the cylinder for operating the bar 163, as above described. The cylinder 196 admits air to a relay operating a valve for cutting the air off from the distributer and at the same time admits air to the cylinder 197 operating the discriminator return against the action of the spring 81 (Fig. 16). The piston 198 of the cylinder 199 next comes into operation and admits compressed air through the pipe 200 to the relay 201 blowing the latter and thus admitting pressure from the pipe 202 to the cylinder 203 in which is located a piston 204 connected by a suitable rod or link or other convenient connection 205 (Figs. 22 and 18) with the type-writer carriage so that the latter begins to return to its initial position for printing the next invoice line. While the carriage is being returned the cylinder 206 admits air through the pipe 207 (Fig. 20) to the cylinder 144 thus returning the clearing mechanism for the extension counters and simultaneously the piston for operating the mechanism returning the disks 121 is also returned to its normal position. The cylinder 208 in turn admits compressed air to the cylinders 2 (Fig. 2) operating to return all those coördinator slides which have been previously drawn. Finally, the cylinder 209 admits air to a relay arrangement similar to those already described and employed for operating the bar 128 (Fig. 19) so that the machine determines whether the invoice total or grand total counters require an extra carry and the cams still continuing their rotation until eventually the bell crank lever 183 drops into its notch or recess under the action of its spring thereby depressing the piston 178 so that air is shut off from the clutch cylinder 180 so that the clutch 181 may be returned in any suitable manner as, for example, by means of a spring whereupon the cams are brought to rest and locked in position, and the locking plate 186 is also allowed to return to its normal position so that the extension, carried forward, and invoice total keys are released. The "carried forward" key is shown at 210 and the operations which occur are very similar to those above described in reference to the extension key. The main difference is that when the "carried forward" key is depressed the relay 176 is blown so that compressed air now passes to the other set of cams 211, the arrangement of which is similar to that of the cams 182. Those cylinders around the cams 211 which perform similar operations to those above described are given similar reference numerals so that their action may be easily followed. In addition to the cylinder 199 operating the carriage return, a second cylinder 212 must be provided to operate first, as in printing the "carried forward" total the carriage requires to be returned after printing the last extension to the position in which it commences to print the "carried forward" total. This is effected after the cylinder 196 has cut air off from the distributer and operated the discriminator return by the passage of air from the cylinder 212 through the pipe 213 to the relay 214 which admits pressure through the pipe 215 to the back of the piston 216 operating the carriage through its short return path and simultaneously to the back of the piston 217 in the cylinder 218 whereby the rod 168 and with it the pawl 169 is raised.

When operating the "carried forward" and invoice total keys 210 and 219 it is necessary to discriminate the direction of wiping or clearing to zero of the copy apparatus and for this purpose we provide a discriminator 220 similar to the discriminator 176 for determining which of the sets of cams shall be brought into operation; thus, when the "carried forward" key is depressed compressed air passes through the pipe 221 to the discriminator 220 and air passes through the pipe 222 from the cylinder 195 by way of the pipe 223 to that side of the piston 159 (Fig. 21) which operates the copying wipe in the anti-clockwise direction so that the total is transferred to the invoice total as above described while when the invoice total key is depressed the discriminator 220 is blown so that the copying mechanism is cleared to zero in the clockwise direction.

In addition it will be clear that two sets of cylinders for performing the functions of cutting air off from the distributer and returning the discriminator and similarly for operating the clearing of the extension counter and the bringing into register of the disks 121 will have to be provided seeing that the extension has first to be printed and that thereafter the carriage is returned by the medium of the piston 216 to the position for printing the "carried forward" total and the operations above referred to have then to be repeated. In all respects other than those hereinbefore mentioned the two sets of mechanism are completely similar and it will be seen that the cylinder 199 is the last to operate so that the carriage may be returned to its initial position for commencing the line on the new invoice sheet after the "carried forward" total has been printed, the series of operations during the return of the "carried forward" being performed as before.

Similarly when it is required to print a "grand total" all that requires to be done is to depress a special grand total key which mechanically or otherwise operates an air valve to admit air to the cylinder operating the wiping mechanism for the grand total counter, thus transferring the total to the extension counter, after which the operations are the same as those described in connection with the printing of the extension.

The operation of the machine may now be broadly described in relation to a specific example in so far as concerns the calculation of the machine, the method of printing the calculation obtained by the machine and other details connected with the typewriter and the counting mechanism being thereafter described.

On referring to Fig. 1, it is supposed that it is required to calculate the result of five articles at £5. 0. 0. per article. The operator following the line of the invoice depresses the 5 key, which is represented at 38 in Fig. 1, and air is admitted from the pressure pipe 49 as above described to the printing cylinder 51 whereupon the numeral 5 is printed upon the sheet in the type-writer. Simultaneously air from the valve or box 50 (Fig. 1) passes by way of the pipe or tube 53, to the tunnel or row $w$ (indicated by the dotted line in Fig. 1) of the pencil valves surrounding the distributer corresponding to the numeral 5 as shown. At the same time, the type-writing carriage being in the D' position, air is admitted to the corresponding pencil valve through the distributer arm $i$ (Fig. 15) so that the corresponding rod or slide $t$ is momentarily blown against the action of the controlling spring $u$, so that all the rows $w$ of that particular pencil valve are in communication with all the tubes or pipes $z$ leading from the pencil valve. As, however, the 5 tunnel is the only one which is supplied with compressed air there is only one particular aperture for the escape of this compressed air indicated at 54. The air passes from this aperture by way of the corresponding tube $z$ to the valves admitting air to the tunnels of the main coordinator.

Since the value of the numeral type is 5 this may be built up, as described above, of III II so that it will be seen on following the diagram of Fig. 1 that air is admitted from the aperture 54 to the II and III tunnels in the D' coördinator.

As the operator continues to type the invoice line he or she will in due course arrive at the rate (that is the £5) and it may be noted in passing that to simplify our arrangement we may so adjust the movements of the distributer in relation to the movement of the type-writer carriage that the distributer arm makes exactly one revolution during the time that the type-writer carriage is occupied in traveling through that part of the standard line which in the machine being described is allocated to the text. When, therefore, the operator presses the 5 key for the rate, that is, the key 38 the numeral 5, as before, is printed on the invoice sheet and the compressed air is admitted to the 5 tunnel of the pencil valves. The carriage, of course, is in the position for printing pounds so that the distributer arm $i$ (Fig. 15) is opposite the U pencil valve, and its rod $t$ is therefore blown as before described so that the particular aperture $x$ indicated at 61 is coördinated and the compressed air passes through the particular pipe $z$, corresponding to the aperture 61, to the cylinder or cylinders operating the required slides in the coördinator. In the case under consideration as the rate is £5 this may be conveniently built up of 4 U+U so that the air passing from the aperture 61 in the pencil valve travels by way of its pipe or tube $z$ to the cylinders 62 (Fig. 1) serving to operate the 4 U and U slides of the coördinator (Fig. 4). In this way we get the following four points or apertures coördinated, viz: D' II, 4 U, D' II, U, D' III, 4 U, and D' III U; compressed air is thus admitted to the corresponding pipes or tubes *g* shown by dotted lines and passing to their particular cylinders and pistons operating the particular tube or tubes 7 (Figs. 5, 6, and 7) above described in connection with the hopper in order to release the required number of balls to the requisite counters. Thus the pipe D′ II 4 U leads to the piston operating the tube indicated in the central diagram by 4 U 8, the latter signifying that it is the function of this particular tube to deliver at such times as it is brought into operation 8 balls to the U counter seeing that the tube is located directly above the U trough, the balls from which are ultimately delivered to the U counter as above described in connection with the hopper details. Similarly the pipe D′ III, 4 U=12 U=T+2 U leads to the piston which operates the pair of tubes indicated by 4 U 1 2 located respectively above the T and U troughs and showing that one ball is to be delivered to the T counter while two are delivered to the U counter. Similarly the D′ II U pipe supplies compressed air to the tube indicated by U 2 and placed above the U trough thus showing that two balls are to be delivered to the U counter while the pipe D′ III U leads to the tube marked U 3 which delivers three balls to the U counter. It will thus be seen that in all one ball is delivered to the T counter while fifteen balls are delivered to the U counter. This means that since the U counting wheel has ten teeth and carries once per revolution it will have carried one ball to the T counter and itself will show 5 so that the result of the specific calculation which is being described is 2 T 5 U=£25.

It must be remembered that the coördination of the D′ II and D′ III tunnels with the 4 U and U slides (Figs. 2 to 4) means that compressed air will be admitted from the apertures corresponding to the partial products given by such coördination; that is, the partial products obtained by multiplying D′ II and 4 U+U, and D′ III×4 U+U, so that the apertures D′ II 4 U, D′ II U, D′ III 4 U and D′ III U, are coördinated, and compressed air passing through such apertures will be led to those of the tubes 7 (Figs. 6, 7, and 15) corresponding to these partial products as determined by the previous calculation above referred to.

Thus D′ III 4 U corresponds to the two units X £4, that is, £8, and consequently this aperture leads to the particular tube 7 which delivers eight balls to the units of pounds counter. D′ II U means two units×£1, that is, £2 and this aperture leads to that particular tube, which, when moved, always delivers two balls to the units of pounds counter. D′ III 4 U means three units×£4, that is, £12, that is £10+£2, and this aperture therefore leads to that group of tubes which deliver one ball to the tens of pounds counter, and two balls to the units of pounds counter. D′ III U means three units×£1, that is, £3, and this aperture therefore leads to that particular tube which delivers a group of three balls to the units of pounds counter.

The result therefore of the above series of coördination is as follows:—

From the D′ II 4 U coördination eight balls are delivered to the units of pounds counter;

From the D′ III U coördination two balls are delivered to the units of pounds counter;

From the D′ III 4 U coördination one ball is delivered to the tens of pounds counter and two balls to the units of pounds counter; and From the D′ III U coördination three balls are delivered to the units of pounds counter.

There are thus delivered one ball to the tens of pounds counter and fifteen to the units of pounds counter, the latter resulting in a complete revolution of the units of pounds counter, which carries one to the tens of pounds counter, while in its final position the units of pounds counter shows 5; so that the final result of the calculation will be to show two on the tens of pounds counter and five on the units of pounds counter, making £25 total as previously described.

Having now traced the operation of calculation formed by the machine it will here be convenient to describe how the printing is effected, and for this purpose the specific example given above will be employed. It will be remembered that the result of the example referred to and which has to be printed was £25, and upon referring to Fig. 1 it will be seen that the T blow-box stands at 2 while the U blow-box is at 5, that is to say the holes in the seating and the valve disk in the respective blow-boxes are in register at the positions 2 and 5.

The T blow-box is connected by means of the pipe or tube 88 with an inner tunnel 89 on the printing distributer which is in all respects similar to the typing distributer hereinbefore described, the inner tunnel 89 being connected with a supply of compressed air so that the latter passes by means of the tube 88 to the T blow-box and through the ports which are in register at the position 2 by way of the pipe 90 to the pipe or aperture in the pencil valve above tunnel 2 and as at this point the carriage is in the position for printing tens of pounds the distributer arm simultaneously blows the pencil valve so that the 2 tunnel receives a supply of compressed air which passes by way of the pipe or tube 91 to the printing cylinder which operates the 2 type lever. The figure 2 is printed in the position for tens of pounds upon the invoice sheet, the carriage having been spaced to this position without performing any printing by virtue of the discriminator as above described. Similarly the connections may be followed out for the U blow-box when it will be found that the compressed air passes by the pipe 92 to the printing cylinder operating the 5 type lever, the carriage being at that moment in the position for printing units of pounds; naughts will, of course, be printed in the shillings and pence positions seeing that the discriminator was moved by virtue of its spring 81 at the moment that the 2 in £25. 0. 0. was printed. The diagram given in Fig. 1 also illustrates the connections for the calculation of five articles at $\frac{15}{32}$ of a penny and in view of the complete description above given for the specific calculation of five articles at £5. 0. 0. it will be unnecessary to give a further description of the second calculation thus referred to with the exception of some reference to the printing mechanism.

In the case of fractions as above described we prefer to employ minor coördinator systems, which are in all respects similar to the main coördinator described, in connection therewith and these with the requisite connections are illustrated in the diagram of Fig. 1. It will be found upon following out the calculation of five articles at $\frac{15}{32}$ of a penny, the Q and Z counting wheels and therefore the corresponding blow-boxes will indicate the positions 1, 3 and 2 respectively. For the purpose of avoiding any binding action in the minor coördinators, we prefer to operate the H and Z coördinators first and it will be seen that a separate pencil valve 93 is provided for this purpose upon the printing distributer. Compressed air passes from the inner tunnel of the printing distributer by way of the pipe 94 to the H and Z blow-boxes whence it passes through the registered apertures at 3 and 2 by way of pipes 95 and 100 to the 3 H and 2 Z tunnels on the minor coördinators 96 and 99 and similarly air passes from the Q blow-box to the L Q slide of the coördinator 96 whereby the aperture 97 is coördinated after the manner described above in connection with the main coördinator and the compressed air passes by tube 98 and operates the 3 H slide in the 1 Q coördinator of the minor coördinator 99 so that the aperture 101 corresponding to $\frac{15}{32}$ (which is the result of the calculation being considered) is coördinated and the compressed air supply passes by the pipe 102 to the printing cylinder operating the $\frac{15}{32}$ type lever.

As a further example it is supposed that it is required to calculate the result of 12 articles at £25 per article. The operator following the line of the invoice depresses the 1 key on the type-writer keyboard and air is admitted from the pressure pipe 49 to the printing cylinder 51 whereupon the numeral 1 is printed upon the sheet in the type-writer. Simultaneously air from the valve box 106 (Fig. 15) passes to the tunnel or row $w$ of the pencil valves surrounding the denominational selector corresponding to the numeral 1. At the same time the type-writing carriage being in the position C′ air is admitted to the corresponding pencil valve through the denominational selection arm $i$ so that the corresponding rod or slide $t$ is momentarily blown against the action of the controlling spring $u$ so that all the rows $w$ of that particular pencil valve are in communication with all the tubes $z$ leading from the pencil valve. As, however, the I tunnel is the only one which is supplied with compressed air, there is only one particular aperture for this compressed air. The air passes from this aperture by way of the tube $z$ to the valve admitting air to the I tunnel of the C′ coördinator. The 2 key is now depressed by the operator and the numeral 2 printed on the sheet in the type-writer. On the type-writer carriage having moved on a step and thus brought the denominational selector arm $i$ into the D′ position, the valve admitting air to the II tunnel of the D′ coördinator is operated. The operator now continues to type the invoice line and will in due course arrive at the rate, which in this instance is £25. After spacing the carriage along until it is in the position for printing tens of pounds, so that the denominational selector is opposite the T pencil valve, the operator presses the 2 type-writer key and admits pressure to the tunnel or row $w$ of the pencil valves $s$ corresponding to the numeral 2. The rod $t$ of the T pencil valve having been blown by the denominational selector arm $i$ as previously described, pressure passes by one of the tubes $z$ to the cylinder operating the slide 2 T of the coördinator. The carriage has been moved one step and the denominational selector arm been brought opposite the U pencil valve, the rod $t$ of which was blown. The operator now presses the 5 key and thus admits air pressure to the tunnel or row $w$ corresponding to the numeral 5, and so by way of the tubes $z$ to the slides 4 U and U of the coördinator. In this way the following points or apertures have been coördinated:—D′ II, 2 T; D′ II, 4 U; D′ II, U and C′ I, 2 T; C′ I, 4 U; C′ I, U. Compressed air is thus admitted to the corresponding tubes $g$ and passes to their particular cylinders and pistons operating the particular tube or tubes in the hopper to release the required number of balls to the requisite counters. By reference to the diagram (Figs. 1 and 25) it will be seen that the pipe D′ II, 2 T will operate the tube indicated by 2 $T_4$ and deliver four balls to the T counter; D' II, 4 U will operate the tube indicated by 4 U$_4$ and deliver eight balls to the U counter; D' II, U will operate the tube indicated by U$_2$ and deliver two balls to the U counter; C' I, 2 T will operate the tube indicated by 2 T$_2$ and deliver two balls to C counter; C' I, 4 U will operate the tube indicator by 4 U$_4$ and deliver four balls to the T counter; and C' I, U will operate the tube indicated by U, and deliver 1 ball to the T counter. It will thus be seen that two balls have been delivered to the C counter, nine to the T counter and ten to the U counter. This means that since the U counting wheel has ten teeth and carries once per revolution it will have carried one ball to the T and itself show 0. The T counter has, however, already received 9 balls and having also a ten teeth counting wheel with one carry per revolution it will carry one ball to the C counter and show 0 itself. It will thus be seen that the C counter will have received in all three balls so that when the product key has been depressed by the operator to obtain the result of the calculation the result printed will be £300.

It will now be convenient to consider the two examples above described as being two separate items of an invoice. As already described the operator after typing the "item," "text" and "rate" of the first item, presses the extension key, whereupon the time-cams 182 (Fig. 24) commence to revolve, locking the type keys and spacing the type-writer carriage through the printing zone, to print the extension or product for the previous line, the line just typed being, however, the first line of the invoice, the counting mechanisms will all stand at zero, and the carriage will be merely spaced along, nothing being printed by virtue of the discriminator not having been operated. While the operator is typing the next item the calculation for the previous line is being made by the machine, and on the extension key being depressed the result, viz: £25, will be printed in its correct position and the extension counters alone, cleared to zero, leaving the invoice total and grand total counters still registering £25. Assuming, however, that the second item completes the invoice, the operator instead of depressing the extension key, would depress the invoice total key, thus setting in motion the second set of time-cams described in connection therewith, and the machine would print first the extension for the previous line after which the type-writer carriage would be returned by the piston 216 (Fig. 22) into the position for printing the invoice total. By virtue of the time-cams, as already described, the extension counters have been wiped to zero after printing, and the invoice total counters are now wiped, setting up the figures at which they stand, on the blow-boxes attached to the extension counters to enable them to be printed. The result of the first calculation left the invoice counters and grand total counters registering 2 T 5 U and the second calculation adding 3 C thereto, the sum of the two set up on the invoice and grand total counters would be 3 C, 2 T, 5 U or £325. 0. 0., which being printed as the invoice total, would leave only the grand total counter registering 3 C, 2 T, 5 U, both the extension and invoice total counters being wiped to zero. It will be remembered that after each extension is printed the bar 128 is moved, allowing the pins 120 (Fig. 11) upon the grooved slides 119 to be pressed into contact with the pairs of disks 121. It will be seen that as all the counting wheels of the C. T. U. counters are ten point, carrying once per revolution, no one of them has accumulated sums sufficient to require to carry, $i.\,e.$, has made a complete revolution; and, consequently, the genevas 125 have not been turned so that the holes 127 in the pairs of disks remain out of register with one another and prevent the slides 119 from moving sufficiently to cause an extra carry. If now the operator were to type an invoice of one line, for example: 209 articles @ £4. 0. 0. per article, there would be added to the grand total counter 8 C, 3 T, 6 U, making a total of 11 C, 5 T, 11 U, but these being ten point counters as above described, both the C and U counters will have made one complete revolution and stand at 1. The genevas, which are driven by the driving wheels mounted on the grand total shafts of these counters, will therefore have been turned one quarter of a revolution, so that the holes in the disks attached to these genevas will be brought into register with the holes in the corresponding disk, and when next the bar 128 is moved the pins 120 on the slides 119 will pass through both disks and cause a ball to be released into the grand total counter of next higher denomination, after which the grand total counters will register 1 M, 1 C, 6 T, 1 U, and if the operator required the grand total, he or she could by depressing the grand total key obtain the result printed, after typing any suitable text as, for example, "Grand total of invoices made out re —— account—£1161. 0. 0" as previously described.

It is to be understood that the invention is not to be confined to any particular limits of capacity, and calculations may be readily made on our improved machine which involve complex items, such as weights and measures, different systems of coinage, rates per cent. and the like.

Similarly the details above described by way of example may be variously modified without departing from the spirit and scope of the invention. Thus many different ways may be employed for coördinating the partial products, it being understood that the word "coördinating" is used throughout in its philosophical sense. For example, instead of employing compressed air in connection with the sets of sliding pieces and tunnels as above mentioned, we may provide rods corresponding to all the possible registered passages in two sets of sliding pieces, and upon producing a registered passage by operating the sliding pieces by compressed air or otherwise, all the rods are lowered, and only that rod which is above a registered passage will be able to pass through the system of sliding pieces and thereafter operate mechanism to release the group of balls or other objects representing the partial product corresponding to the registered passage. Again, instead of using compressed air or rods, an electrical contact may be made by two conductors brought into contact through the registered passage and such contact may effect an electro-magnetic release of the balls or the like. In a further modification, the sets of sliding pieces may be arranged one above the other but provided with hooks, pins, or projections which normally act to obstruct the passage of the balls through the tubes to which they are stored, each tube passage being obstructed by one pin of a multiplier slider and by one pin of a multiplicand slider, so that release of a group of balls is only effected by the movement of both sliders. Further, the movement of the pins or hooks may open to a secondary release of the ball group. Electrical conductors suitably insulated and connected may be substituted for the pins or hooks so that when a multiplier slider and a multiplicand slider are moved the conductors make contact and effect an electromagnetic release of the balls.

It will be clear to those skilled in the art that the system of coördination employed in connection with our machine may be largely extended as, for example, we may employ additional sets of coördinators having varying functions. In this manner we are enabled, for example, by setting the slides of an auxiliary coördinator to correspond with a particular fixed rate of exchange to convert foreign notation such as kilograms, francs or other expressions into the corresponding English expressions as lbs. and English money notation, and other conversions will readily suggest themselves. Further, by a very simple modification the machine may be readily adapted to act as a pure adding machine by employing an additional distributer without the intervention of a coördinator so that upon typing a particular numeral key the number of balls corresponding to the value of the key is released from hopper to counting mechanism having the denomination corresponding to the particular carriage position when the key is pressed and in this manner by merely adding balls or groups of balls together the machine may be converted into a pure adding machine, such conversion being conveniently effected by the turning of a handle or lever from a position marked "invoice" to a position marked "adding," this movement of the lever serving to actuate a rod or other controlling means whereby the compressed air admitted upon the typing of the machine keys may be diverted from the ordinary calculating mechanism to the adding distributer.

In like manner the machine may be readily adapted to perform the operation of subtraction. For this purpose we provide two sets of counters adapted to be fed with balls from the hopper and to be driven thereby in the same direction. One set of counters is employed for setting up the minuend and the tubes conveying the balls are swung over by any simple form of mechanism, in order to deliver the right numbers of balls corresponding to the subtrahend into the other counters, which are thereby rotated in the same direction as the first set of counters referred to. As the counters are geared together the correct sum will be set up on the latter set of counters and the carry balls required during the calculation are delivered in the manner described above, from the minuend counters to the next higher denomination of the subtracted counters, so that it is not necessary, as might be supposed, to subtract a ball at any time.

Having now described our invention what we claim as new and desire to secure by Letters Patent is:—

1. In a calculating machine of the character set forth, groups of separate objects to represent the partial products, the number in each group corresponding to the value of the particular partial product concerned.

2. In a calculating machine of the character set forth, groups of separate objects to represent the partial products, the number in each group corresponding to the value of the particular partial product, and means for finding the partial products required for any particular calculation.

3. In a calculating machine of the character set forth, groups of separate objects to represent the partial products, the number in each group corresponding to the value of the particular partial product concerned, means for finding the partial products required for any particular calculation, and means for determining the value of the partial products when found.

4. In a calculating machine of the character set forth, groups of separate objects to represent the partial products, the number in each group corresponding to the value of the particular partial product, means for finding the partial products required for any particular calculation, means for determining the value of the partial products when found, and means for expressing the partial products in their correct denominational values.

5. In a calculating machine of the character set forth, groups of separate objects to represent the partial products, the number in each group corresponding to the value of the particular partial product, means for finding the partial products required for any particular calculation, means for determining the value of the partial products when found, and means for adding the various partial products when found to give the complete product.

6. In a calculating machine of the character set forth, groups of separate objects to represent the partial products, the number in each group corresponding to the value of the particular partial product, means for finding the partial products required for any particular calculation, means for determining the value of the partial products when found, means for expressing the partial products in their correct denominational values, and means for adding the various partial products when found and determined in order to give the complete product.

7. In a calculating machine of the character set forth, groups of separate objects to represent the partial products, the number in each group corresponding to the value of the particular partial product, means for finding the partial products required for any particular calculation, means for determining the value of the partial products when found, means for adding the various partial products when found and determined in order to give the complete product, and means for utilizing the significant positions of the totalizing devices to show or print the total product or extension.

8. In a calculating machine of the character set forth, balls to represent the partial products, a hopper for storing said balls and means for delivering any number of said balls corresponding to any particular partial products required.

9. In a calculating machine of the character set forth, balls to represent the partial products, a hopper for storing said balls, tubes depending from said hopper and means for fixing the number of balls to be delivered at one time by each of said tubes corresponding to the partial product represented by said tube.

10. In a calculating machine of the character set forth, balls to represent the partial products, a hopper for storing said balls, tubes depending from said hopper, means for fixing the number of balls to be delivered at one time by each tube, and means for delivering the balls from said tubes when required.

11. In a calculating machine of the character set forth, balls to represent the partial products, a hopper for storing said balls, tubes depending from said hopper, and sluice plates in connection with said tubes for fixing the number of balls to be delivered at one time by each tube.

12. In a calculating machine of the character set forth, balls to represent the partial products, a hopper for storing said balls, tubes depending from said hopper, sluiceplates in connection with said tubes for fixing the number of balls to be delivered at one time by each tube and means for delivering said balls when required.

13. In a calculating machine of the character set forth, balls to represent the partial products, a hopper for storing said balls, tubes depending from said hopper, sluiceplates in connection with said tubes for fixing the number of balls to be delivered at one time by each tube, troughs arranged beneath said tubes and provided with delivery openings normally out of register with said tubes, and means for moving said tubes into register with their corresponding delivery openings when required.

14. In a calculating machine of the character set forth, balls to represent the partial products, a hopper for storing said balls, tubes depending from said hopper and adapted to deliver balls when required and means for determining which of said tubes are to be operated for a particular calculation.

15. In a calculating machine of the character set forth, balls to represent the partial products, a hopper for storing said balls, tubes depending from said hopper and adapted to deliver said balls when required, and a coördinator for determining which of the tubes are to be operated for any particular calculation.

16. In a calculating machine of the character set forth, balls to represent the partial products, a hopper for storing said balls, tubes depending from said hopper, means for delivering the balls from said tubes when required and means for counting the balls so delivered.

17. In a calculating machine of the character set forth, balls to represent the partial products, a hopper for storing said balls, tubes depending from said hopper, means for delivering the balls from said tubes when required, means for counting the balls so delivered, and means for expressing the value of the partial products represented by said balls in their proper denominational values.

18. In a calculating machine of the character set forth, balls to represent the partial products, a hopper for storing said balls, tubes depending from said hopper, means for determining which of the tubes are to be operated for a given calculation, means for delivering the balls from said tubes and means for counting the balls so delivered.

19. In a calculating machine of the character set forth, balls to represent the partial products, a hopper for storing said balls, tubes depending from said hopper, means for determining which of the tubes are to be operated for a given calculation, means for delivering the balls from said tubes, means for counting the balls so delivered and means for adding the various partial products so found.

20. In a calculating machine of the character set forth balls to represent the partial products, a hopper for storing said balls, tubes depending from said hopper, a coordinator for determining which of said tubes are to be operated for any given calculation, means for delivering the balls from said tubes when so required and means for counting the balls so delivered.

21. In a calculating machine of the character set forth, balls to represent the partial products, a hopper for storing said balls, tubes depending from said hopper, troughs arranged beneath said tubes and having delivery openings normally out of register with the said tubes, means for moving said tubes when required into register with the corresponding delivery openings and counting mechanism to which said balls are delivered.

22. In a calculating machine of the character set forth balls to represent partial products, a hopper for storing said balls, tubes depending from said hopper, troughs arranged beneath said tubes and having delivery openings normally out of register with said tubes, means for moving said tubes into register with the corresponding delivery openings when required, means for determining which of said tubes are to be so moved for any particular calculation, and counting mechanism to which said balls are delivered.

23. In a calculating machine of the character set forth, separate objects to represent the partial products, a type-writer machine and means operated on depressing the type-writer keys for finding and delivering the correct number of separate objects required for any particular calculation.

24. In a calculating machine of the character set forth, balls to represent the partial products, a hopper for storing said balls, a type-writer machine and means operated on depressing the type-writer keys for finding and delivering the correct number of balls corresponding to any particular products required.

25. In a calculating machine of the character set forth, balls to represent the partial products, a hopper for storing said balls, tubes depending from said hopper, means for fixing the number of balls to be delivered at one time by each of said tubes corresponding to the partial product represented by said tube, a type-writer machine and means operated on depressing the type-writer keys for finding and delivering the correct number of balls from said tubes corresponding to the values of the keys depressed.

26. In a calculating machine of the character set forth, balls to represent the partial products, a hopper for storing said balls, tubes depending from said hopper, means for fixing the number of balls to be delivered at one time by each tube, a type-writer machine and means operated on depressing the typewriter keys for delivering the balls from said tubes when required.

27. In a calculating machine of the character set forth, balls to represent the partial products, a hopper for storing said balls, tubes depending from said hopper, sluice plates in connection with said tubes for fixing the number of balls to be delivered at one time by each tube, a type-writer machine and means operated on depressing the type-writer keys for delivering the balls from said tubes when required.

28. In a calculating machine of the character set forth, balls to represent the partial products, a hopper for storing said balls, tubes depending from said hopper, sluice-plates in connection with said tubes for fixing the number of balls to be delivered at one time by each tube, troughs arranged beneath said tubes and provided with delivery openings normally out of register with said tubes, a type-writer machine and means operated on depressing the type-writer keys for moving the particular tubes required into register with their corresponding delivery openings.

29. In a calculating machine of the character set forth, balls to represent the partial products, a hopper for storing said balls, tubes depending from said hopper and adapted to deliver balls when required, a type-writer machine and means operated on depressing the type-writer keys for determining which of said tubes are to be operated for a particular calculation.

30. In a calculating machine of the character set forth, balls to represent the partial products, a hopper for storing said balls, tubes depending from said hopper and adapted to deliver said balls when required, a type-writer machine and a coördinator operated upon depressing the type-writer keys for determining which of said tubes are to be operated for any given values of the keys depressed.

31. In a calculating machine of the character set forth, balls to represent the partial products, a hopper for storing said balls, tubes depending from said hopper, a type-writer machine, means operated on depressing the type-writer keys for delivering the required number of balls from said tubes and means for counting the balls so delivered.

32. In a calculating machine of the character set forth, balls to represent the partial products, a hopper for storing said balls, tubes depending from said hopper, a type-writer machine, means operated on depressing the type-writer keys for delivering the balls from said tubes when required, means for utilizing the position of the type-writer carriage to determine the denominational value of the balls delivered from the machine and means for counting the balls so delivered.

33. In a calculating machine of the character set forth, balls to represent the partial products, a hopper for storing said balls, tubes depending from said hopper, a type-writer machine, means operated on depressing the type-writer keys for delivering the balls from said tubes when required and a distributer for utilizing the position of the type-writer carriage to determine the denominational values of the balls delivered from the machine.

34. In a calculating machine of the character set forth, balls to represent the partial products, a hopper for storing said balls, tubes depending from said hopper, a type-writer machine, means operated on depressing the type-writer keys for delivering the balls from said tubes when required, a distributer for utilizing the position of the type-writer carriage to determine the denominational values of the balls delivered from the machine and means for counting the balls so delivered.

35. In a calculating machine of the character set forth, balls to represent the partial products, a hopper for storing said balls, tubes depending from said hopper, a type-writer machine, means operated on depressing the type-writer keys for determining which of the tubes are to be operated corresponding to the values of the keys depressed, means for delivering the balls from said tubes and means for counting the balls so delivered.

36. In a calculating machine of the character set forth, balls to represent the partial products, a hopper for storing said balls, tubes depending from said hopper, a type-writer machine, means operated on depressing the type-writer keys for determining which of the tubes are to be operated corresponding to the values of the keys depressed, means for delivering the balls from said tubes, means for counting the balls so delivered and means for adding the various partial products so found.

37. In a calculating machine of the character set forth, balls to represent the partial products, a hopper for storing said balls, tubes depending from said hopper, a type-writer machine, a coördinator operated on depressing the type-writer keys for determining which of said tubes are to be operated corresponding to the values of the keys depressed, and means for delivering the balls from said tubes when so required.

38. In a calculating machine of the character set forth, balls to represent the partial products, a hopper for storing said balls, tubes depending from said hopper, a type-writer machine, a coördinator operated on depressing the type-writer keys for determining which of said tubes are to be operated corresponding to the values of the keys depressed, means for delivering the balls from said tubes when so required and means for counting the balls so delivered.

39. In a calculating machine of the character set forth, balls to represent the partial products, a hopper for storing said balls, tubes depending from said hopper, troughs arranged beneath said tubes and having delivery openings normally out of register with said tubes, a type-writer machine, means operated on depressing the type-writer keys for moving the particular tubes corresponding to the values of the keys depressed into register with the corresponding delivery openings in the troughs and counting mechanism to which said balls are delivered.

40. In a calculating machine of the character set forth, balls to represent the partial products, a hopper for storing said balls, tubes depending from said hopper, troughs arranged beneath said tubes and having delivery openings normally out of register with said tubes, a type-writer machine, means operated on depressing the type-writer keys for determining which of said tubes are to be operated corresponding to the values of the keys depressed, means for moving said tubes into register with the corresponding delivery openings and counting mechanism to which said balls are delivered.

41. In a calculating machine of the character set forth, balls to represent the partial products, a hopper for storing said balls, tubes depending from said hopper, a type-writer machine, means operated on depressing the type-writer keys for delivering the required number of balls from said tubes, counting mechanism for giving the value of the balls so delivered, and means for clearing the counting mechanism to zero.

42. In a calculating machine of the character set forth, balls to represent the partial products, a hopper for storing said balls, tubes depending from said hopper, a typewriter machine, means operated on depressing the type-writer keys for delivering the required number of balls from said tubes, counting mechanism operated by the balls for giving the value of the balls so delivered, tubular shafts upon which said counting mechanisms are mounted, keys or projections on the interior of said shafts and a spindle having projections thereon and passing through said tubular shafts.

43. In a calculating machine of the character set forth, balls to represent the partial products, a hopper for storing said balls, tubes depending from said hopper, a typewriter machine, means operated on depressing the type-writer keys for delivering the required number of balls from said tubes, counting mechanism operated by the balls for giving the value of the balls so delivered, tubular shafts upon which said counting mechanisms are mounted, keys or projections on the interior of said shafts and means for imparting a helical motion to said spindle.

44. In a calculating machine of the character set forth, balls to represent the partial product, a hopper for storing said balls, tubes depending from said hopper, a typewriter machine, means operated on depressing the type-writer keys for delivering the required number of balls from said tubes, counting mechanism for giving the value of the balls so delivered and means operated by said counting mechanism for actuating the type levers of the type-writer machine corresponding to the value found by the counting mechanism.

45. In a calculating machine of the character set forth, balls to represent the partial products, a hopper for storing said balls, tubes depending from said hopper, a typewriter machine, means operated on depressing the type-writer keys for delivering the required number of balls from said tubes, counting mechanism for giving the value of the balls so delivered, pneumatic cylinders and pistons for operating the type levers of the type-writer machine, and means operated by the counting mechanism for admitting compressed air to the particular cylinders and pistons required for printing the value found by the counting mechanism.

46. In a calculating machine of the character set forth, balls to represent the partial products, a hopper for storing said balls, tubes depending from said hopper, a typewriter machine, means operated on depressing the type-writer keys for delivering the required number of balls from said tubes, counting mechanism for giving the value of the balls so delivered, pneumatic cylinders and pistons for operating the type levers of the type-writer machine, blow-boxes mounted upon the shaft of the counting mechanism for admitting compressed air to the particular cylinders and pistons required for printing the value found by the counting mechanism.

47. In a calculating machine of the character set forth, separate objects to represent the partial products, a type-writer machine, means operated on depressing the type-writer keys for finding and delivering the correct number of separate objects required for any particular calculation, and means for locking the type-writer machine against operation when the carriage has passed into the printing zone.

48. In a calculating machine of the character set forth, balls to represent the partial products, a hopper for storing said balls, tubes depending from said hopper, a typewriter machine, means operated on depressing the type-writer keys for delivering the required number of balls from said tubes, means for counting the balls so delivered, means for printing the result of any particular calculation found by the counting mechanism and means for insuring that naughts shall not be printed to the left of any significant digit.

49. In a calculating machine of the character set forth, balls to represent the partial products, a hopper for storing said balls, tubes depending from said hopper, a typewriter machine, means operated on depressing the type-writer keys for delivering the required number of balls from said tubes, means for counting the balls so delivered, means for printing the result of any particular calculation found by the counting mechanism and a discriminator operated when the first significant digit is printed by the machine to insure that naughts shall only be printed to the right of a significant digit.

50. In a calculating machine of the character set forth, separate objects to represent the partial products, means for finding the partial products required for any particular calculation, means for determining the value of the partial products when found, means for printing the result of the calculation found in the machine and a minor coördinator to facilitate the printing of split numbers.

51. In a calculating machine of the character set forth, balls to represent the partial products, a hopper for storing said balls, tubes depending from said hopper, a typewriter machine, means operated on depressing the type-writer keys for delivering the required number of balls from said tubes, counting mechanism for giving the value of the balls so delivered, means for printing the result of the calculation and a minor co-ordinator to facilitate the printing of split numbers.

In testimony whereof we have signed our names to this specification in the presence of two subscribing witnesses.

MARK BARR.
ROBERT ARTHUR BELL.

Witnesses:
B. H. MATTHEWS,
W. WARREN TRIGGE.